US012313750B2

(12) United States Patent
Ma et al.

(10) Patent No.: US 12,313,750 B2
(45) Date of Patent: May 27, 2025

(54) EPHEMERIS INFORMATION SIGNALING

(71) Applicant: QUALCOMM Incorporated, San Diego, CA (US)

(72) Inventors: Liangping Ma, San Diego, CA (US); Xiao Feng Wang, San Diego, CA (US); Umesh Phuyal, San Diego, CA (US); Alberto Rico Alvarino, San Diego, CA (US); Ayan Sengupta, San Diego, CA (US); Bharat Shrestha, San Diego, CA (US); Peter Gaal, San Diego, CA (US); Changhwan Park, San Diego, CA (US); Jun Ma, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/821,155

(22) Filed: Aug. 19, 2022

(65) Prior Publication Data

US 2023/0055881 A1 Feb. 23, 2023

Related U.S. Application Data

(60) Provisional application No. 63/260,476, filed on Aug. 20, 2021.

(51) Int. Cl.
*G01S 19/27* (2010.01)
*G01S 19/52* (2010.01)
(Continued)

(52) U.S. Cl.
CPC ............. *G01S 19/27* (2013.01); *G01S 19/52* (2013.01); *H04W 4/029* (2018.02); *H04W 84/06* (2013.01)

(58) Field of Classification Search
CPC ....................................................... G01S 19/27
(Continued)

(56) References Cited

U.S. PATENT DOCUMENTS

| 5,896,388 | A | * | 4/1999 | Earnest | ................... | H04L 65/80 |
| | | | | | | 370/230.1 |
| 2009/0295634 | A1 | * | 12/2009 | Yu | ........................... | G01S 19/27 |
| | | | | | | 342/357.64 |

(Continued)

FOREIGN PATENT DOCUMENTS

| CN | 111510198 B | 3/2022 |
| WO | WO-2014083745 A1 | 6/2014 |

(Continued)

OTHER PUBLICATIONS

ERICSSON: "On UL Time and Frequency Synchronization Enhancements for NTN", R1-2005502, 3GPP TSG-RAN WG1 Meeting #102-e, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, 13 Pages, XP051917511, Section 3-5.

(Continued)

*Primary Examiner* — Qutbuddin Ghulamali
(74) *Attorney, Agent, or Firm* — Harrity & Harrity, LLP

(57) ABSTRACT

Various aspects of the present disclosure generally relate to wireless communication. In some aspects, a user equipment (UE) may receive a coordinate switch indication that indicates that the UE is to calculate a first value of a new ephemeris coordinate of a plurality of coordinates. The UE may calculate the first value of the new ephemeris coordinate based on one or more other ephemeris coordinates of the plurality of ephemeris coordinates and may generate ephemeris information, associated with a non-terrestrial communication device, based on the calculation of the first value of the new ephemeris coordinate. The UE may com- (Continued)

municate with the non-terrestrial communication device based on the ephemeris information. Numerous other aspects are described.

20 Claims, 17 Drawing Sheets

(51) Int. Cl.
  *H04W 4/029* (2018.01)
  *H04W 84/06* (2009.01)
(58) Field of Classification Search
  USPC ................................................... 455/456.1
  See application file for complete search history.

(56) References Cited

U.S. PATENT DOCUMENTS

| | | | |
|---|---|---|---|
| 2010/0085247 A1* | 4/2010 | Venkatraman | G01S 19/05 |
| | | | 342/358 |
| 2011/0181464 A1* | 7/2011 | Vasilyev | G01S 19/40 |
| | | | 342/357.27 |
| 2019/0041526 A1* | 2/2019 | Lucky | G01S 19/27 |

FOREIGN PATENT DOCUMENTS

| | | |
|---|---|---|
| WO | WO-2017142584 A1 | 8/2017 |
| WO | WO-2021066696 A1 | 4/2021 |

OTHER PUBLICATIONS

International Search Report and Written Opinion—PCT/US2022/075244—ISA/EPO—Nov. 25, 2022.

ZTE: "Discussion on UL synchronization for NR-NTN", 3GPP TSG RAN WG1 #105-e, R1-2105190, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 17 Pages, May 12, 2021, XP052011268, Section 4.

* cited by examiner

EPHEMERIS INFORMATION SIGNALING

CROSS-REFERENCE TO RELATED APPLICATION

This Patent Application claims priority to U.S. Provisional Patent Application No. 63/260,476, filed on Aug. 20, 2021, entitled "EPHEMERIS INFORMATION SIGNALING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for ephemeris information signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a coordinate switch indication that indicates that the UE is to calculate a first value of a new ephemeris coordinate, of a plurality of ephemeris coordinates. The method may include calculating the first value of the new ephemeris coordinate based on receiving the coordinate switch indication. The calculation of the first value of the new ephemeris coordinate may be based on one or more other ephemeris coordinates of the plurality of ephemeris coordinates. The method may include generating ephemeris information, associated with a non-terrestrial communication device, based on the calculation of the first value of the new ephemeris coordinate; and communicating with the non-terrestrial communication device based on the ephemeris information.

Some aspects described herein relate to a method of wireless communication performed by a UE. The method may include transmitting a model indication that indicates a computation model type to be used by the UE to determine one or more ephemeris coordinates associated with a non-terrestrial communication device. The method may include receiving a correction indication that indicates one or more correction values for the one or more ephemeris coordinates based at least in part on the computation model type.

Some aspects described herein relate to a method of wireless communication performed by a UE. The method may include receiving an orbit radius indication associated with an orbit radius of a non-terrestrial communication device. The method may include determining the orbit radius based on the orbit radius indication and generating ephemeris information associated with the non-terrestrial communication device based on the determined orbit radius. The method may include communicating with the non-terrestrial communication device based on the ephemeris information.

Some aspects described herein relate to a method of wireless communication performed by a UE. The method may include receiving a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device. The method may include receiving the coordinate indication, wherein the coordinate indication comprises the set of bits.

Some aspects described herein relate to a method of wireless communication performed by a non-terrestrial communication device. The method may include determining that a first value of a new ephemeris coordinate, of a plurality of ephemeris coordinates is to be calculated by a UE. The method may include transmitting a coordinate switch indication that indicates that the UE is to calculate the first value of the new ephemeris coordinate.

Some aspects described herein relate to a method of wireless communication performed by a non-terrestrial communication device. The method may include determining a selected velocity coordinate of a plurality of velocity coordinates to be calculated by a UE based on one or more of the plurality of velocity coordinates. The method may include transmitting a coordinate switch indication associated with the selected velocity coordinate to the UE.

Some aspects described herein relate to a method of wireless communication performed by a non-terrestrial communication device. The method may include receiving a model indication that indicates a computation model type to be used by a UE to determine one or more ephemeris coordinates associated with the non-terrestrial communication device. The method may include transmitting a correction indication that indicates one or more correction values for the one or more ephemeris coordinates based at least in part on the computation model type.

Some aspects described herein relate to a method of wireless communication performed by a non-terrestrial communication device. The method may include determining an orbit radius of the non-terrestrial communication device. The method may include transmitting an orbit radius indication associated with the orbit radius.

Some aspects described herein relate to a method of wireless communication performed by a non-terrestrial communication device. The method may include transmitting a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device. The method may include transmitting the coordinate indication, wherein the coordinate indication comprises the set of bits.

Some aspects described herein relate to an apparatus. The apparatus may include a memory comprising instructions. The apparatus may include one or more processors configured to execute the instructions and cause the apparatus to calculate a first ephemeris coordinate of a plurality of ephemeris coordinates. The apparatus may include one or more processors configured to execute the instructions and cause the apparatus to generate first ephemeris information, associated with a non-terrestrial communication device, based on the calculation of the first ephemeris coordinate; and communicate with the non-terrestrial communication device based on the first ephemeris information. The one or more processors may be configured to cause the apparatus to obtain a coordinate switch indication that indicates that the apparatus is to calculate an ephemeris coordinate, of the plurality of ephemeris coordinates, other than the first ephemeris coordinate. The one or more processors may be configured to cause the apparatus to calculate a second ephemeris coordinate based on receiving the coordinate switch indication. The calculation of the second ephemeris coordinate may be based on one or more other ephemeris coordinates of the plurality of ephemeris coordinates. The one or more processors may be configured to cause the apparatus to generate second ephemeris information, associated with a non-terrestrial communication device, based on the calculation of the second ephemeris coordinate; and communicate with the non-terrestrial communication device based on the second ephemeris information.

Some aspects described herein relate to a UE for wireless communication. The user equipment may include a memory and one or more processors coupled to the memory. The one or more processors may be configured to receive a coordinate switch indication associated with a selected velocity coordinate of a plurality of velocity coordinates to be calculated based on one or more of the plurality of velocity coordinates. The one or more processors may be configured to calculate the selected velocity coordinate to determine ephemeris information associated with a non-terrestrial communication device.

Some aspects described herein relate to a UE for wireless communication. The user equipment may include a memory and one or more processors coupled to the memory. The one or more processors may be configured to transmit a model indication that indicates a computation model type to be used by the UE to determine one or more ephemeris coordinates associated with a non-terrestrial communication device. The one or more processors may be configured to receive a correction indication that indicates one or more correction values for the one or more ephemeris coordinates based at least in part on the computation model type.

Some aspects described herein relate to a UE for wireless communication. The user equipment may include a memory and one or more processors coupled to the memory. The one or more processors may be configured to receive an orbit radius indication associated with an orbit radius of a non-terrestrial communication device. The one or more processors may be configured to determine ephemeris information associated with the non-terrestrial communication device based at least in part on the orbit radius.

Some aspects described herein relate to a UE for wireless communication. The user equipment may include a memory and one or more processors coupled to the memory. The one or more processors may be configured to receive a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device. The one or more processors may be configured to receive the coordinate indication, wherein the coordinate indication comprises the set of bits.

Some aspects described herein relate to an apparatus. The apparatus may include a memory comprising instructions. The apparatus may include one or more processors configure to cause the apparatus to determine that an ephemeris coordinate, of a plurality of ephemeris coordinates, other than a first ephemeris coordinate of the plurality of ephemeris coordinates, is to be calculated by a UE. The one or more processors may be configured to cause the apparatus to output for transmission a coordinate switch indication that indicates that the UE is to calculate the ephemeris coordinate other than the first ephemeris coordinate.

Some aspects described herein relate to a non-terrestrial communication device for wireless communication. The non-terrestrial communication device may include a memory and one or more processors coupled to the memory. The one or more processors may be configured to determine a selected velocity coordinate of a plurality of velocity coordinates to be calculated by a UE based on one or more of the plurality of velocity coordinates. The one or more processors may be configured to transmit a coordinate switch indication associated with the selected velocity coordinate to the UE.

Some aspects described herein relate to a non-terrestrial communication device for wireless communication. The non-terrestrial communication device may include a memory and one or more processors coupled to the memory. The one or more processors may be configured to receive a model indication that indicates a computation model type to be used by a UE to determine one or more ephemeris coordinates associated with the non-terrestrial communication device. The one or more processors may be configured to transmit a correction indication that indicates one or more correction values for the one or more ephemeris coordinates based at least in part on the computation model type.

Some aspects described herein relate to a non-terrestrial communication device for wireless communication. The non-terrestrial communication device may include a memory and one or more processors coupled to the memory. The one or more processors may be configured to determine an orbit radius of the non-terrestrial communication device.

The one or more processors may be configured to transmit an orbit radius indication associated with the orbit radius.

Some aspects described herein relate to a non-terrestrial communication device for wireless communication. The non-terrestrial communication device may include a memory and one or more processors coupled to the memory. The one or more processors may be configured to transmit a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device. The one or more processors may be configured to transmit the coordinate indication, wherein the coordinate indication comprises the set of bits.

Some aspects described herein relate to a non-transitory computer-readable medium that stores a set of instructions for wireless communication by a UE. The set of instructions, when executed by one or more processors of the UE, may cause the UE to receive a coordinate switch indication associated with a selected position coordinate of a plurality of position coordinates to be calculated based on one or more of the plurality of position coordinates. The set of instructions, when executed by one or more processors of the UE, may cause the UE to calculate the selected position coordinate to determine ephemeris information associated with a non-terrestrial communication device.

Some aspects described herein relate to a non-transitory computer-readable medium that stores a set of instructions for wireless communication by a UE. The set of instructions, when executed by one or more processors of the UE, may cause the UE to receive a coordinate switch indication associated with a selected velocity coordinate of a plurality of velocity coordinates to be calculated based on one or more of the plurality of velocity coordinates. The set of instructions, when executed by one or more processors of the UE, may cause the UE to calculate the selected velocity coordinate to determine ephemeris information associated with a non-terrestrial communication device.

Some aspects described herein relate to a non-transitory computer-readable medium that stores a set of instructions for wireless communication by a UE. The set of instructions, when executed by one or more processors of the UE, may cause the UE to transmit a model indication that indicates a computation model type to be used by the UE to determine one or more ephemeris coordinates associated with a non-terrestrial communication device. The set of instructions, when executed by one or more processors of the UE, may cause the UE to receive a correction indication that indicates one or more correction values for the one or more ephemeris coordinates based at least in part on the computation model type.

Some aspects described herein relate to a non-transitory computer-readable medium that stores a set of instructions for wireless communication by a UE. The set of instructions, when executed by one or more processors of the UE, may cause the UE to receive an orbit radius indication associated with an orbit radius of a non-terrestrial communication device. The set of instructions, when executed by one or more processors of the UE, may cause the UE to determine ephemeris information associated with the non-terrestrial communication device based at least in part on the orbit radius.

Some aspects described herein relate to a non-transitory computer-readable medium that stores a set of instructions for wireless communication by a UE. The set of instructions, when executed by one or more processors of the UE, may cause the UE to receive a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device. The set of instructions, when executed by one or more processors of the UE, may cause the UE to receive the coordinate indication, wherein the coordinate indication comprises the set of bits.

Some aspects described herein relate to a non-transitory computer-readable medium that stores a set of instructions for wireless communication by a non-terrestrial communication device. The set of instructions, when executed by one or more processors of the non-terrestrial communication device, may cause the non-terrestrial communication device to determine a selected position coordinate of a plurality of position coordinates to be calculated by a UE based on one or more of the plurality of position coordinates. The set of instructions, when executed by one or more processors of the non-terrestrial communication device, may cause the non-terrestrial communication device to transmit a coordinate switch indication associated with the selected position coordinate to the UE.

Some aspects described herein relate to a non-transitory computer-readable medium that stores a set of instructions for wireless communication by a non-terrestrial communication device. The set of instructions, when executed by one or more processors of the non-terrestrial communication device, may cause the non-terrestrial communication device to determine a selected velocity coordinate of a plurality of velocity coordinates to be calculated by a UE based on one or more of the plurality of velocity coordinates. The set of instructions, when executed by one or more processors of the non-terrestrial communication device, may cause the non-terrestrial communication device to transmit a coordinate switch indication associated with the selected velocity coordinate to the UE.

Some aspects described herein relate to a non-transitory computer-readable medium that stores a set of instructions for wireless communication by a non-terrestrial communication device. The set of instructions, when executed by one or more processors of the non-terrestrial communication device, may cause the non-terrestrial communication device to receive a model indication that indicates a computation model type to be used by a UE to determine one or more ephemeris coordinates associated with the non-terrestrial communication device. The set of instructions, when executed by one or more processors of the non-terrestrial communication device, may cause the non-terrestrial communication device to transmit a correction indication that indicates one or more correction values for the one or more ephemeris coordinates based at least in part on the computation model type.

Some aspects described herein relate to a non-transitory computer-readable medium that stores a set of instructions for wireless communication by a non-terrestrial communication device. The set of instructions, when executed by one or more processors of the non-terrestrial communication device, may cause the non-terrestrial communication device to determine an orbit radius of the non-terrestrial communication device. The set of instructions, when executed by one or more processors of the non-terrestrial communication device, may cause the non-terrestrial communication device to transmit an orbit radius indication associated with the orbit radius.

Some aspects described herein relate to a non-transitory computer-readable medium that stores a set of instructions for wireless communication by a non-terrestrial communication device. The set of instructions, when executed by one or more processors of the non-terrestrial communication device, may cause the non-terrestrial communication device to transmit a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device. The set of instructions, when executed by one or more processors of the non-terrestrial communication device, may cause the non-terrestrial communication device to transmit the coordinate indication, wherein the coordinate indication comprises the set of bits.

Some aspects described herein relate to an apparatus for wireless communication. The apparatus may include means for receiving a coordinate switch indication associated with a selected position coordinate of a plurality of position coordinates to be calculated based on one or more of the plurality of position coordinates. The apparatus may include means for calculating the selected position coordinate to determine ephemeris information associated with a non-terrestrial communication device.

Some aspects described herein relate to an apparatus for wireless communication. The apparatus may include means for receiving a coordinate switch indication associated with a selected velocity coordinate of a plurality of velocity coordinates to be calculated based on one or more of the plurality of velocity coordinates. The apparatus may include means for calculating the selected velocity coordinate to determine ephemeris information associated with a non-terrestrial communication device.

Some aspects described herein relate to an apparatus for wireless communication. The apparatus may include means for transmitting a model indication that indicates a computation model type to be used by the apparatus to determine one or more ephemeris coordinates associated with a non-terrestrial communication device. The apparatus may include means for receiving a correction indication that indicates one or more correction values for the one or more ephemeris coordinates based at least in part on the computation model type.

Some aspects described herein relate to an apparatus for wireless communication. The apparatus may include means for receiving an orbit radius indication associated with an orbit radius of a non-terrestrial communication device. The apparatus may include means for determining ephemeris information associated with the non-terrestrial communication device based at least in part on the orbit radius.

Some aspects described herein relate to an apparatus for wireless communication. The apparatus may include means for receiving a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device. The apparatus may include means for receiving the coordinate indication, wherein the coordinate indication comprises the set of bits.

Some aspects described herein relate to an apparatus for wireless communication. The apparatus may include means for determining a selected position coordinate of a plurality of position coordinates to be calculated by a UE based on one or more of the plurality of position coordinates. The apparatus may include means for transmitting a coordinate switch indication associated with the selected position coordinate to the UE.

Some aspects described herein relate to an apparatus for wireless communication. The apparatus may include means for determining a selected velocity coordinate of a plurality of velocity coordinates to be calculated by a UE based on one or more of the plurality of velocity coordinates. The apparatus may include means for transmitting a coordinate switch indication associated with the selected velocity coordinate to the UE.

Some aspects described herein relate to an apparatus for wireless communication. The apparatus may include means for receiving a model indication that indicates a computation model type to be used by a UE to determine one or more ephemeris coordinates associated with the apparatus. The apparatus may include means for transmitting a correction indication that indicates one or more correction values for the one or more ephemeris coordinates based at least in part on the computation model type.

Some aspects described herein relate to an apparatus for wireless communication. The apparatus may include means for determining an orbit radius of the apparatus. The apparatus may include means for transmitting an orbit radius indication associated with the orbit radius.

Some aspects described herein relate to an apparatus for wireless communication. The apparatus may include means for transmitting a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device. The apparatus may include means for transmitting the coordinate indication, wherein the coordinate indication comprises the set of bits.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
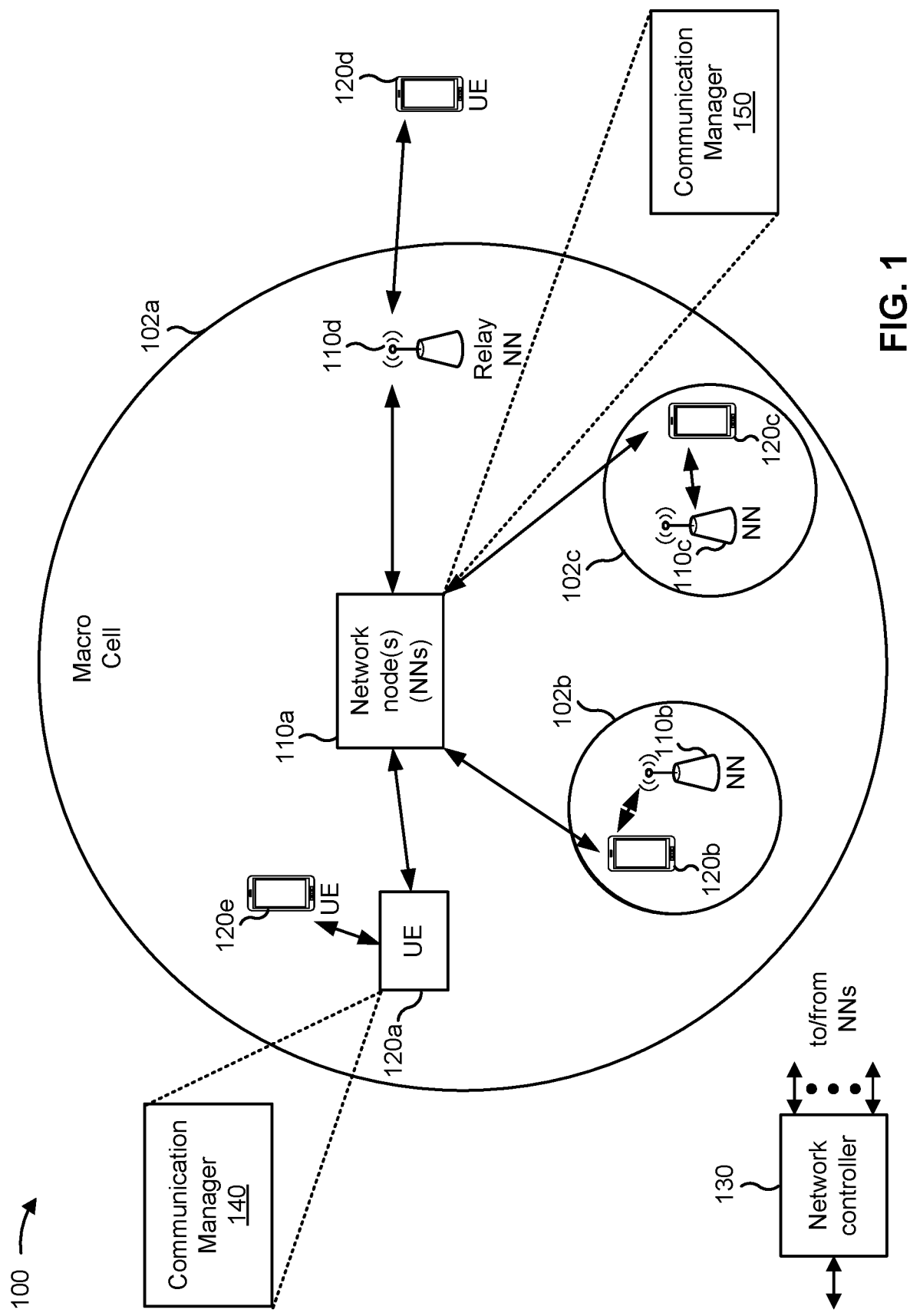
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as an NN 110*a*, an NN 110*b*, an NN 110*c*, and an NN110*d*), a user equipment (UE) 120 or multiple UEs 120 (shown as a UE 120*a*, a UE 120*b*, a UE 120*c*, a UE 120*d*, and a UE 120*e*), and/or other network entities. A network node 110 is an entity that communicates with UEs 120. A network node 110 (sometimes referred to as an NN) may include, for example, an NR base station, an LTE base station, a Node B, an eNB (e.g., in 4G), a gNB (e.g., in 5G), an access point, and/or a transmission reception point (TRP). Each network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the NN 110*a* may be a macro base station for a macro cell 102*a*, the NN 110*b* may be a pico base station for a pico cell 102*b*, and the NN 110*c* may be a femto base station for a femto cell 102c. A network node may support one or multiple (e.g., three) cells.

In some examples, a cell may not necessarily be stationary, and the geographic area of the cell may move according to the location of a network node 110 that is mobile (e.g., a mobile base station). In some examples, the network nodes 110 may be interconnected to one another and/or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the NN 110d (e.g., a relay network node) may communicate with the NN 110a (e.g., a macro network node) and the UE 120d in order to facilitate communication between the NN 110a and the UE 120d. A network node 110 that relays communications may be referred to as a relay station, a relay network node, a relay base station, a relay, or the like.

In some aspects, the wireless network 100 may include one or more non-terrestrial network (NTN) deployments in which a non-terrestrial wireless communication device (which may be alternatively referred to as a "non-terrestrial communication device") may include a network node such as a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial wireless communication device such as a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, a non-terrestrial wireless communication device, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the UE 120 may include a communication manager 140. As described in more detail elsewhere herein, the communication manager 140 may calculate a first ephemeris coordinate of a plurality of ephemeris coordinates; generate first ephemeris information, associated with a non-terrestrial communication device, based on the calculation of the first ephemeris coordinate; communicate with the non-terrestrial communication device based on the first ephemeris information; receive a coordinate switch indication that indicates that the apparatus is to calculate an ephemeris coordinate, of the plurality of ephemeris coordinates, other than the first ephemeris coordinate; calculate a second ephemeris coordinate based on receiving the coordinate switch indication, wherein the calculation of the second ephemeris coordinate is based on one or more other ephemeris coordinates of the plurality of ephemeris coordinates; generate second ephemeris information, associated with a non-terrestrial communication device, based on the calculation of the second ephemeris coordinate; and communicate with the non-terrestrial communication device based on the second ephemeris information.

In some aspects, the communication manager 140 may receive a coordinate switch indication associated with a selected velocity coordinate of a plurality of velocity coordinates to be calculated based on one or more of the plurality of velocity coordinates; and calculate the selected velocity coordinate to determine ephemeris information associated with a non-terrestrial communication device.

In some aspects, the communication manager 140 may transmit a model indication that indicates a computation model type to be used by the UE to determine one or more ephemeris coordinates associated with a non-terrestrial communication device; and receive a correction indication that indicates one or more correction values for the one or more ephemeris coordinates based at least in part on the computation model type.

In some aspects, the communication manager 140 may receive an orbit radius indication associated with an orbit radius of a non-terrestrial communication device; and determine ephemeris information associated with the non-terrestrial communication device based at least in part on the orbit radius.

In some aspects, the communication manager 140 may receive a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device; and receive the coordinate indication, wherein the coordinate indication comprises the set of bits. Additionally, or alternatively, the communication manager 140 may perform one or more other operations described herein.

In some aspects, the non-terrestrial communication device may include a communication manager 150. As described in more detail elsewhere herein, the communication manager 150 may determine that an ephemeris coordinate, of a plurality of ephemeris coordinates, other than a first ephemeris coordinate of the plurality of ephemeris coordinates, is to be calculated by a UE; and transmit a coordinate switch indication that indicates that the UE is to calculate the ephemeris coordinate other than the first ephemeris coordinate.

In some aspects, the communication manager 150 may determine a selected velocity coordinate of a plurality of velocity coordinates to be calculated by a UE based on one or more of the plurality of velocity coordinates; and transmit a coordinate switch indication associated with the selected velocity coordinate to the UE.

In some aspects, the communication manager 150 may receive a model indication that indicates a computation model type to be used by a UE to determine one or more ephemeris coordinates associated with the non-terrestrial communication device; and transmit a correction indication that indicates one or more correction values for the one or more ephemeris coordinates based at least in part on the computation model type.

In some aspects, the communication manager 150 may determine an orbit radius of the non-terrestrial communication device; and transmit an orbit radius indication associated with the orbit radius.

In some aspects, the communication manager 150 may transmit a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device; and transmit the coordinate indication, wherein the coordinate indication comprises the set of bits. Additionally, or alternatively, the communication manager 150 may perform one or more other operations described herein.

As indicated above, FIG. 1 is provided as an example. Other examples may differ from what is described with regard to FIG. 1.

Figure 2:
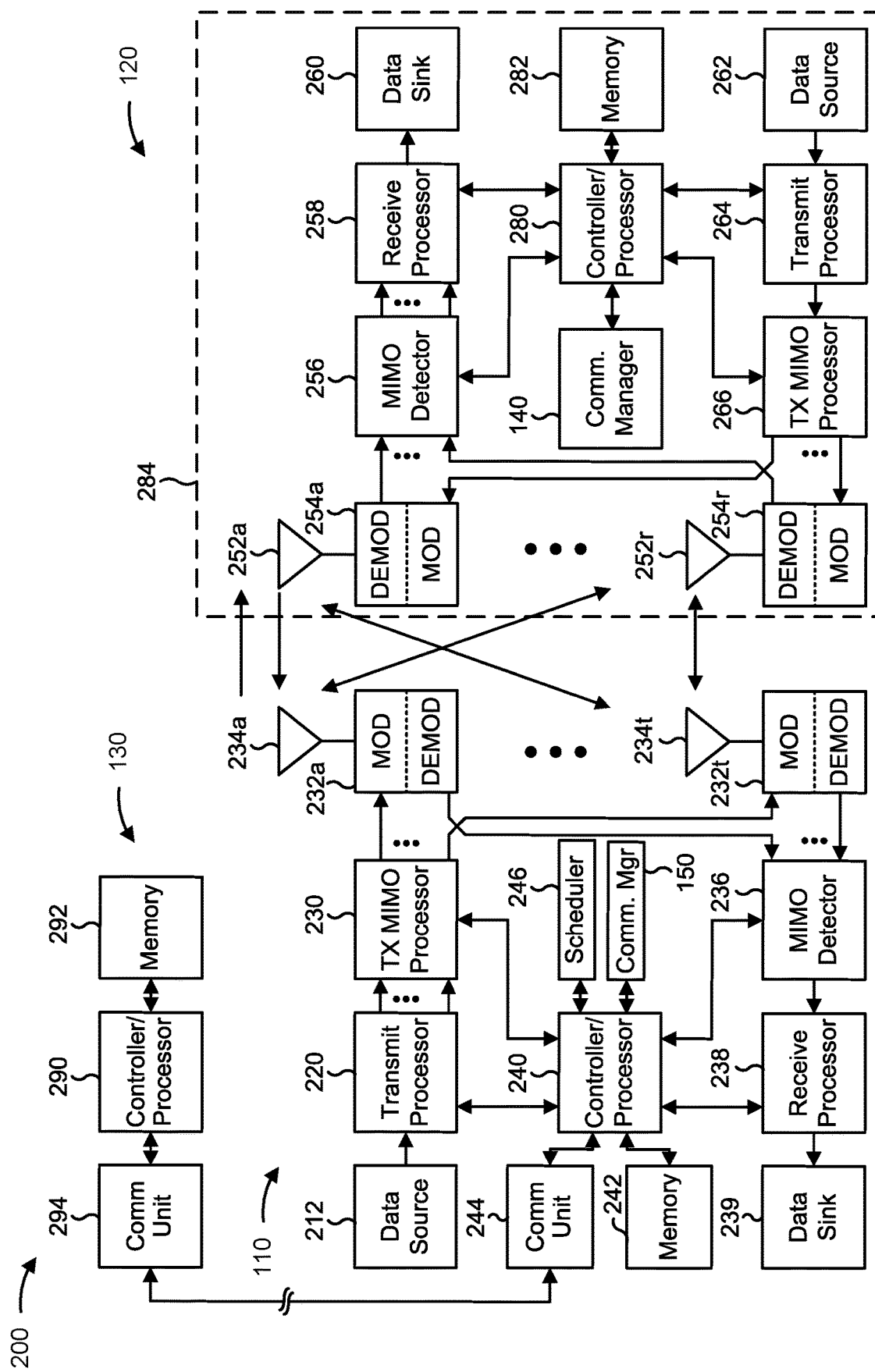
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-16).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-16).

The controller/processor 240 of the network node 110, the controller/processor 280 of the UE 120, and/or any other component(s) of FIG. 2 may perform one or more techniques associated with ephemeris information signaling, as described in more detail elsewhere herein. In some aspects, the non-terrestrial communication device described herein is the network node 110, is included in the network node 110, or includes one or more components of the network node 110 shown in FIG. 2. For example, the controller/processor 240 of the network node 110, the controller/processor 280 of the UE 120, and/or any other component(s) of FIG. 2 may perform or direct operations of, for example, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for calculating a first ephemeris coordinate of a plurality of ephemeris coordinates; means for generating first ephemeris information, associated with a non-terrestrial communication device, based on the calculation of the first ephemeris coordinate; means for communicating with the non-terrestrial communication device based on the first ephemeris information; means for receiving a coordinate switch indication that indicates that the apparatus is to calculate an ephemeris coordinate, of the plurality of ephemeris coordinates, other than the first ephemeris coordinate; means for calculating a second ephemeris coordinate based on receiving the coordinate switch indication, wherein the calculation of the second ephemeris coordinate is based on one or more other ephemeris coordinates of the plurality of ephemeris coordinates; means for generating second ephemeris information, associated with a non-terrestrial communication device, based on the calculation of the second ephemeris coordinate; and means for communicating with the non-terrestrial communication device based on the second ephemeris information. In some aspects, the UE 120 includes means for selecting the second ephemeris coordinate. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a coordinate switch indication associated with a selected velocity coordinate of a plurality of velocity coordinates to be calculated based on one or more of the plurality of velocity coordinates; and/or means for calculating the selected velocity coordinate to determine ephemeris information associated with a non-terrestrial communication device. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for transmitting a model indication that indicates a computation model type to be used by the UE to determine one or more ephemeris coordinates associated with a non-terrestrial communication device; and/or means for receiving a correction indication that indicates one or more correction values for the one or more ephemeris coordinates based at least in part on the computation model type. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving an orbit radius indication associated with an orbit radius of a non-terrestrial communication device; and/or means for determining ephemeris information associated with the non-terrestrial communication device based at least in part on the orbit radius. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device; and/or means for receiving the coordinate indication, wherein the coordinate indication comprises the set of bits. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a non-terrestrial communication device (e.g., the network node 110) includes means for determining that an ephemeris coordinate, of a plurality of ephemeris coordinates, other than a first ephemeris coordinate of the plurality of ephemeris coordinates, is to be calculated by a UE; and transmitting a coordinate switch indication that indicates that the UE is to calculate the ephemeris coordinate other than the first ephemeris coordinate. In some aspects, the non-terrestrial communication device includes means for selecting the second ephemeris coordinate. In some aspects, the means for the non-terrestrial communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the non-terrestrial communication device includes means for determining a selected velocity coordinate of a plurality of velocity coordinates to be calculated by a UE based on one or more of the plurality of velocity coordinates; and/or means for transmitting a coordinate switch indication associated with the selected velocity coordinate to the UE. In some aspects, the means for the non-terrestrial communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the non-terrestrial communication device includes means for receiving a model indication that indicates a computation model type to be used by a UE to determine one or more ephemeris coordinates associated with the non-terrestrial communication device; and/or means for transmitting a correction indication that indicates one or more correction values for the one or more ephemeris coordinates based at least in part on the computation model type. In some aspects, the means for the non-terrestrial communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the non-terrestrial communication device includes means for determining an orbit radius of the non-terrestrial communication device; and/or means for transmitting an orbit radius indication associated with the orbit radius. In some aspects, the means for the non-terrestrial communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the non-terrestrial communication device includes means for transmitting a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device; and/or means for transmitting the coordinate indication, wherein the coordinate indication comprises the set of bits. In some aspects, the means for the non-terrestrial communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, a non-terrestrial communication device, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity," "network node," or "non-terrestrial communication device" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
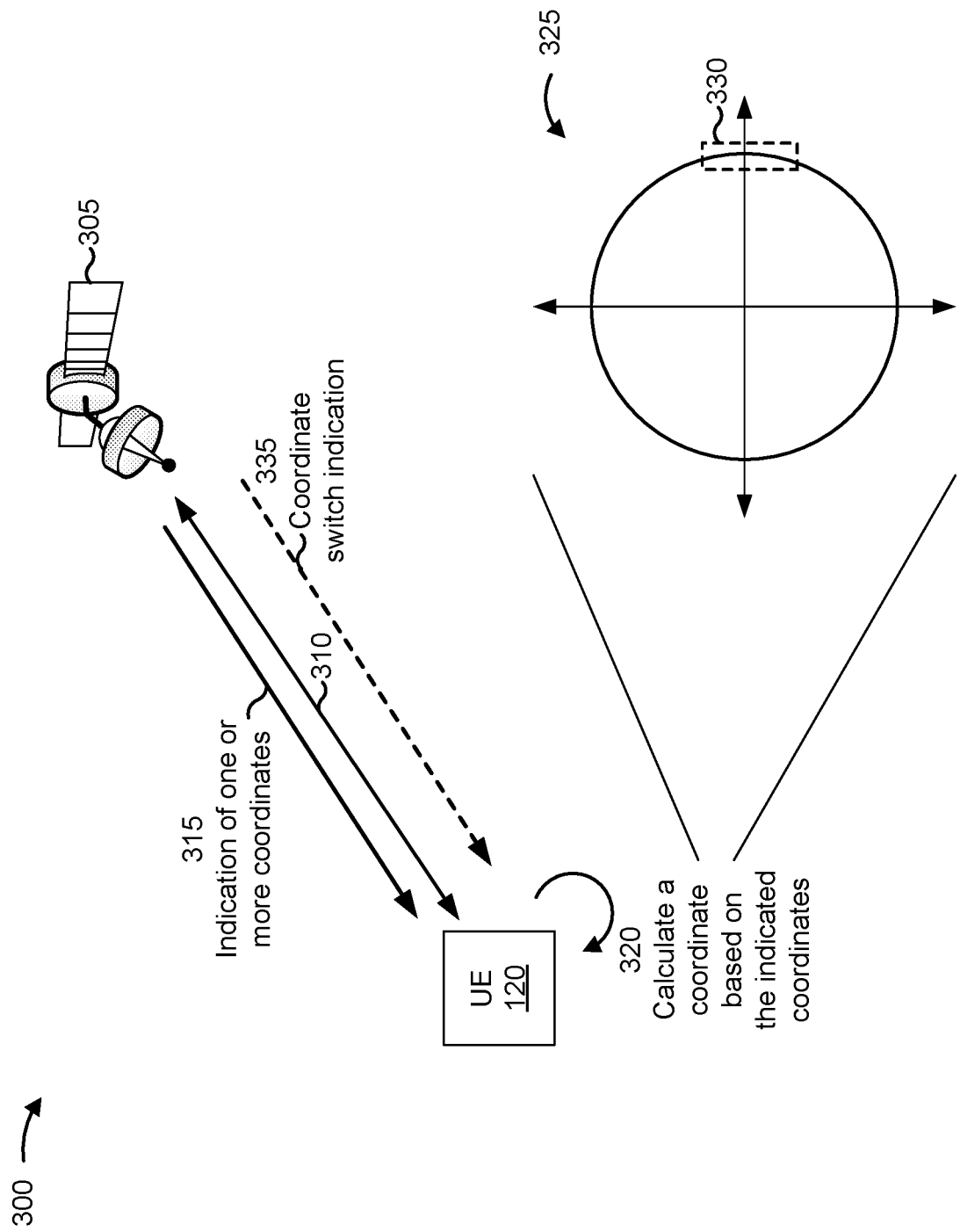
FIG. 3 is a diagram illustrating an example of non-terrestrial communications, in accordance with the present disclosure.

FIG. 3 is a diagram illustrating an example 300 of non-terrestrial communications. As shown, a UE 120 may communicate with a non-terrestrial communication device 305. In some cases, the UE 120 shown in example 300 may be associated with a Global Navigation Satellite System (GNSS) capability or a Global Positioning System (GPS) capability, though not all UEs have such capabilities. In some cases, the non-terrestrial communication device 305 may include a satellite. In example 300, a UE 120 can be served by the non-terrestrial communication device 305 via a service link 310. For example, the non-terrestrial communication device 305 may include a network node such as, for example, a BS 110 (e.g., BS 110a) or a gNB. In some cases, the non-terrestrial communication device 305 may be a regenerative satellite. For example, the non-terrestrial communication device 305 may be referred to as a non-terrestrial base station, a regenerative repeater, or an on-board processing repeater. In some cases, the non-terrestrial communication device 305 may demodulate an uplink radio frequency signal and may modulate a baseband signal derived from the uplink radio signal to produce a downlink radio frequency transmission. The non-terrestrial communication device 305 may transmit the downlink radio frequency signal on the service link 310. The non-terrestrial communication device 305 may provide a cell that covers the UE 120.

In some cases, the non-terrestrial communication device 305 may be referred to as a transparent satellite, which may also be referred to as a bent-pipe satellite. In a transparent deployment, for example, the non-terrestrial communication device 305 may relay a signal received from a gateway (not shown) via a feeder link (not shown). For example, the non-terrestrial communication device 305 may receive an uplink radio frequency transmission and may transmit a downlink radio frequency transmission without demodulating the uplink radio frequency transmission. In some cases, the non-terrestrial communication device 305 may frequency convert the uplink radio frequency transmission received on the service link 310 to a frequency of the uplink radio frequency transmission on the feeder link and may amplify and/or filter the uplink radio frequency transmission.

As shown by reference number 315, the non-terrestrial communication device 305 may transmit an indication of one or more coordinates to the UE 120. As shown by reference number 320, the UE 120 can calculate a coordinate based on the indicated coordinates. The coordinates may be, and/or may be used to determine, satellite ephemeris information of the non-terrestrial communication device 305 and may include, for example, a satellite position state vector and a satellite velocity state vector. The UE 120 may communicate with the non-terrestrial communication device 305 based on the ephemeris information. The satellite position state vector may include coordinates x, y, and z associated with an Earth-centered, Earth-fixed (ECEF) coordinate system. The satellite velocity state vector may include coordinates $V_x$, $V_y$, and $V_z$ associated with the ECEF coordinate system.

In some cases, for example, the non-terrestrial communication device 305 may indicate two of three position and/or velocity coordinates, and the UE 120 may determine the third coordinate based on the two indicated coordinates. For example, it may be observed that $|x|$, $|y|$, $|z|<R+A_{max}$, where R is the radius of the Earth and $A_{max}$ is a maximum altitude of the satellite. Additionally, since $\sqrt{x^2+y^2+z^2}=R+A$, this equation may be used to determine one of the position coordinates based on the other two. Similarly, for the velocity vector, the equation $\sqrt{V_x^2+V_y^2+V_z^2}=|\vec{V}_{sat}+\vec{V}_{rot}|$, where $$|\vec{V}_{sat}| = \sqrt{\frac{GM}{R+A}} \ (=7.56 \text{km/s for } LEO\ 600\text{km}),$$

$|\vec{V}_{rot}|=\omega(R+A)\cos\theta$, and $\theta=\text{asin } z/(R+A)$, may be used to determine one of the velocity coordinates based on the other two. By transmitting values of two coordinates instead of three, the network may save approximately ⅓ of the number of bits that would be used to signal all three position or velocity coordinate values.

However, in some cases, quantization error may introduce numerical instability in computations of the third coordinate, as illustrated by the graphical representation of an aspect of the ECEF coordinate system indicated by reference number 325. For example, since $|z|=\sqrt{(R+A)^2-x^2-y^2}$, when y=0, the slope dz/dx in the region indicated by reference number 330 is high, and $$\Delta|z| \approx -\frac{x\Delta x + y\Delta y}{2\sqrt{(R+A)^2 - x^2 - y^2}}$$

will have a large magnitude. This result contrasts with the practical observation that the value of z should be close to 0. As a result, calculation of z based on indicated values of x and y may be subject to numerical instability in some instances, which may result in negative impacts on network performance due to inaccuracies in determination of ephemeris information.

Some aspects provide for ephemeris information signaling that may allow for indicating coordinate switching, transmission of coordinate correction information, indication of orbit radius, and/or indication of the number of bits in a set of bits to be used to indicate such information. For example, in some aspects, a non-terrestrial communication device may transmit, and a UE may receive, a coordinate switch indication associated with a selected coordinate of a plurality of coordinates to be calculated based on one or more of the plurality of coordinates. The UE may calculate the selected coordinate to determine (i.e., generate) ephemeris information associated with the non-terrestrial communication device. For example, as shown by reference number 335, the non-terrestrial communication device 305 may transmit a coordinate switch indication to the UE 120, indicating that the UE 120 is to switch from calculating a first ephemeris coordinate (a prior ephemeris coordinate) to calculating a second ephemeris coordinate (e.g., a new ephemeris coordinate). In this way, some aspects may provide for signaling a switch in ephemeris coordinate calculation, which may facilitate mitigating numerical instability, thereby enhancing the accuracy of ephemeris calculations. Thus, some aspects may have a positive impact on network performance.

In some aspects, the UE may transmit a model indication that indicates a computation model type to be used by the UE to determine one or more ephemeris coordinates associated with the non-terrestrial communication device, and the non-terrestrial communication device may transmit a correction indication that indicates one or more correction values for the one or more ephemeris coordinates based at least in part on the computation model type. In some aspects, the non-terrestrial communication device may transmit, and the UE may receive an orbit radius indication associated with an orbit radius of the non-terrestrial communication device and the UE may determine (i.e., generate) ephemeris information associated with the non-terrestrial communication device based at least in part on the orbit radius. In some aspects, the non-terrestrial communication device may transmit, and the UE may receive, a bit indication associated with a number of bits in a set of bits to be used to communicate a coordinate indication associated with a coordinate, where the coordinate comprises at least one of a position coordinate associated with a non-terrestrial communication device or a velocity coordinate associated with the non-terrestrial communication device. The UE may receive the coordinate indication, where the coordinate indication comprises the set of bits. The set of bits may include one bit, two bits, three bits, and/or any other number of bits indicated.

As indicated above, FIG. 3 is provided as an example. Other examples may differ from what is described with regard to FIG. 3.

Figure 4:
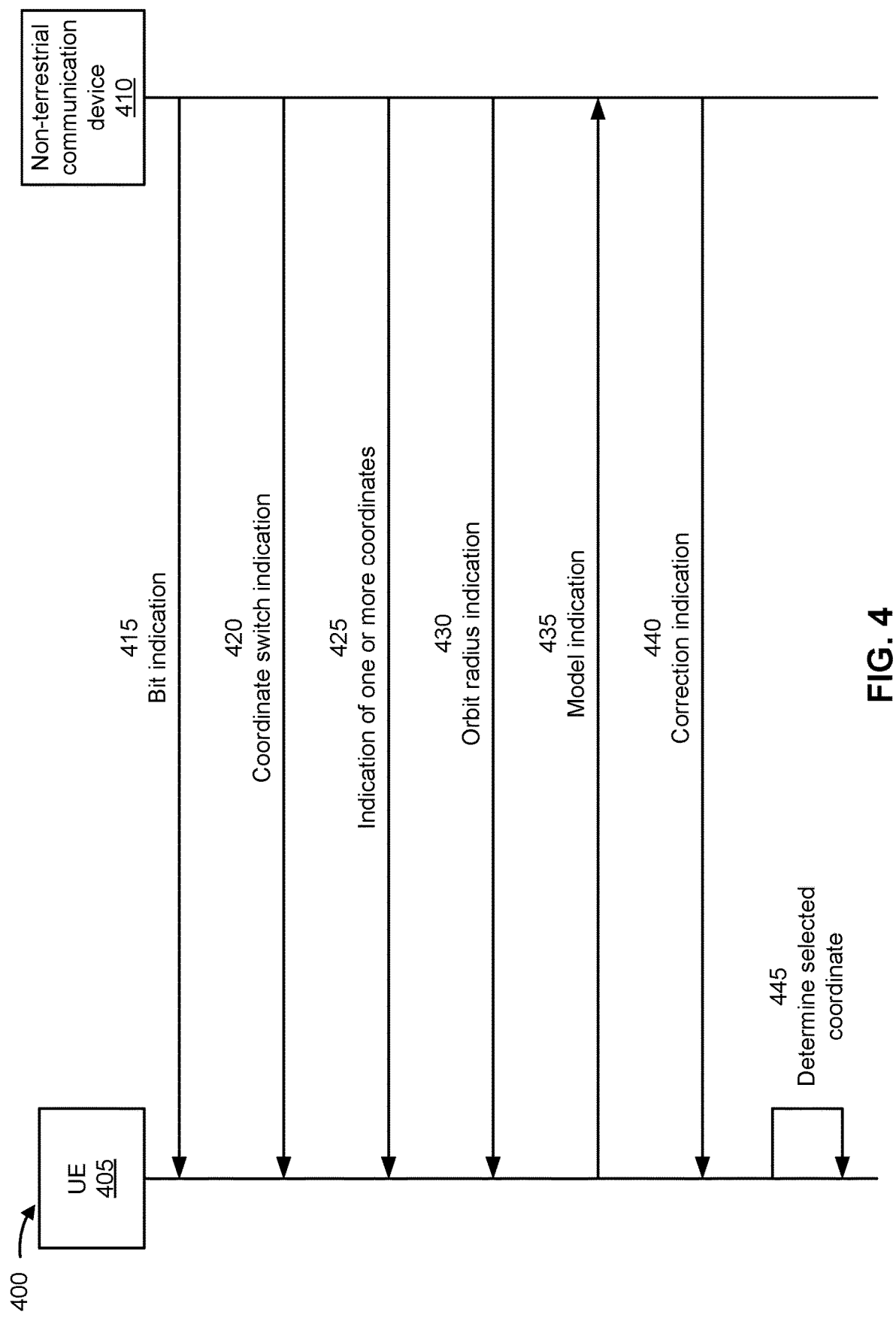
FIG. 4 is a diagram illustrating an example associated with ephemeris information signaling, in accordance with the present disclosure.

FIG. 4 is a diagram illustrating an example 400 associated with ephemeris information signaling, in accordance with the present disclosure. As shown in FIG. 4, a UE 405 and a non-terrestrial communication device 410 may communicate with one another.

As shown by reference number 415, the non-terrestrial communication device 410 may transmit, and the UE 405 may receive, a bit indication. The bit indication may be associated with a number of bits in a set of bits to be used to communicate a coordinate indication associated with a coordinate. The coordinate may include at least one of a position coordinate associated with the non-terrestrial communication device or a velocity coordinate associated with the non-terrestrial communication device. In some aspects, the bit indication indicates an offset from a minimum number of bits. The minimum number of bits may be radio resource control (RRC) configured and/or specified in a wireless communication standard, among other examples. In some aspects, the bit indication may correspond to an entry in a bit number table.

As shown by reference number 420, the non-terrestrial communication device 410 may transmit, and the UE 405 may receive, a coordinate switch indication. The coordinate switch indication may be associated with a selected coordinate (e.g., a second ephemeris coordinate) of a plurality of coordinates to be calculated based on one or more of the plurality of coordinates. The plurality of coordinates may include position coordinates and/or velocity coordinates.

In some aspects, the coordinate switch indication may be based at least in part on a determination that a prior selected coordinate (e.g., a first ephemeris coordinate) is associated with an error that satisfies an error threshold. In some aspects, the coordinate switch indication may be based at least in part on a determination that an absolute value of the prior selected coordinate fails to satisfy a coordinate threshold. The coordinate switch indication may be based at least in part on a determination that the selected coordinate (e.g., a second ephemeris coordinate) has a greater absolute value than one or more absolute values of the one or more other coordinates of the plurality of coordinates.

In some aspects, the coordinate switch indication may include one bit. For example, the coordinate switch indication may indicate that a prior selected coordinate is not to be changed or that the prior selected coordinate is to be changed (e.g., that the UE 405 is to calculate an ephemeris coordinate other than the prior selected coordinate). In some aspects, for example, a zero may indicate that a prior selected coordinate is to be changed, while a one may indicate that the prior selected coordinate is not to be changed, or vice-versa. In some aspects, the UE 405 may select the selected coordinate based at least in part on the coordinate switch indication indicating that the prior selected coordinate is to be changed. The UE 405 may select the selected coordinate based at least in part on at least one of a determination that the selected coordinate has a greater absolute value than one or more absolute values of the one or more of the plurality of coordinates, or a pre-determined order of selection.

In some aspects, the coordinate switch indication may include two bits that indicate the selected coordinate. In some aspects, the coordinate switch indication may include a three bit bitmap that indicates the selected coordinate.

As shown by reference number 425, the non-terrestrial communication device 410 may transmit, and the UE 405 may receive, an indication of one or more coordinates. As explained above, for example, the indication of the one or more coordinates may include an indication of two position coordinates and/or two velocity coordinates. As shown by reference number 430, the non-terrestrial communication device 410 may transmit, and the UE 405 may receive, an orbit radius indication. The orbit radius indication may be associated with an orbit radius of the non-terrestrial communication device 410.

The orbit radius indication may indicate an orbit range corresponding to the orbit radius. The orbit range may include a range of possible radius values from zero to a maximum orbit value. In some aspects, the orbit radius indication may include an explicit indication of the orbit radius. In some aspects, the explicit indication may include at least one of an encoded value based on a uniform quantization or a table of values of radii with non-uniform quantization.

In some aspects, the orbit radius indication may include an implicit indication of the orbit radius. For example, in some aspects, the implicit indication may include system information associated with at least one of the non-terrestrial communication device 410, a non-terrestrial network associated with the non-terrestrial communication device 410, or an additional non-terrestrial communication device associated with the non-terrestrial network. In some aspects, the orbit radius indication may include an offset value relative to a length value. The UE 405 may obtain an indication of the length value and determine the orbit radius based on the length value and the offset. In some aspects, obtaining the length value may include at least one of receiving an indication of the length value or obtaining the length value based at least in part on a wireless communication standard. The UE 405 may receive the indication of the length value by receiving at least one of a system information block (SIB) that includes the length value or an RRC message that includes the length value. The length value may include at least one of a nominal radius of Earth, a mean radius of Earth, an authalic radius of Earth, a volumetric radius of Earth, a rectifying radius of Earth, a global mean radius of curvature of Earth, or an additional offset value. In some aspects, the orbit radius indication may include an explicit indication of the offset value or an implicit indication of the offset value.

In some aspects, the UE 405 may receive a coordinate indication that indicates at least one of a position coordinate associated with the non-terrestrial communication device 410 or a velocity coordinate associated with the non-terrestrial communication device 410. The non-terrestrial communication device 410 may transmit, and the UE 405 may receive, the orbit radius indication by receiving a first communication. The coordinate indication may be transmitted using a second communication. The first communication may include a first SIB having a first SIB type (e.g., a SIB1), and the second communication may include a second SIB having a second SIB type.

In some aspects, the non-terrestrial communication device 410 may transmit, and the UE 405 may receive a first plurality of additional communications comprising a first plurality of additional SIBs having the first SIB type and a second plurality of additional communications comprising a second plurality of additional SIBs having the second SIB type. The UE 405 may receive the first plurality of additional communications according to a first associated frequency of transmission and may receive the second plurality of additional communications according to a second associated frequency of transmission.

In some aspects, the orbit radius indication may include an implicit indication, and the coordinate indication may include an explicit indication. The non-terrestrial communication device 410 may transmit, and the UE 405 may receive, the orbit radius indication by receiving system information during a current communication session with a non-terrestrial network. The UE 405 may determine a prior orbit radius during a prior communication session with the non-terrestrial network and may map the system information to the prior orbit radius to determine a current orbit radius.

In some aspects, the coordinate indication may include an orbit radius indication associated with an orbit radius of the non-terrestrial communication device 410, and the UE 405 may determine a maximum value of the coordinate based at least in part on a determination of at least one of a maximum value of the orbit radius and a major semi axis. The UE 405 may determine a range for the coordinate. The range may include the maximum value of the coordinate and a minimum value of the coordinate. The minimum value of the coordinate may include a negative of the maximum value of the coordinate. The UE 405 may quantize the range for the coordinate to determine a quantized range and may map the quantized range to a number represented by the set of bits.

As shown by reference number 435, the UE 405 may transmit, and the non-terrestrial communication device 410 may receive, a model indication. The model indication may indicate a computation model type to be used by the UE 405 to determine one or more ephemeris coordinates associated with the non-terrestrial communication device 410. As shown by reference number 440, the non-terrestrial communication device 410 may transmit, and the UE 405 may receive, a correction indication that indicates one or more correction values for the one or more ephemeris coordinates based at least in part on the computation model type. The model indication may be sent as a part of a UE capability report, or as a response to a query (e.g., in the form of a MAC CE) from the non-terrestrial communication device 410.

As shown by reference number 445, the UE 405 may calculate one or more ephemeris coordinates (e.g., a selected position coordinate and/or a selected velocity coordinate). The UE 405 may determine (i.e., generate) one or more corrected ephemeris coordinates by applying the one or more correction values to the one or more ephemeris coordinates.

As indicated above, FIG. 4 is provided as an example. Other examples may differ from what is described with respect to FIG. 4.

Figure 5:
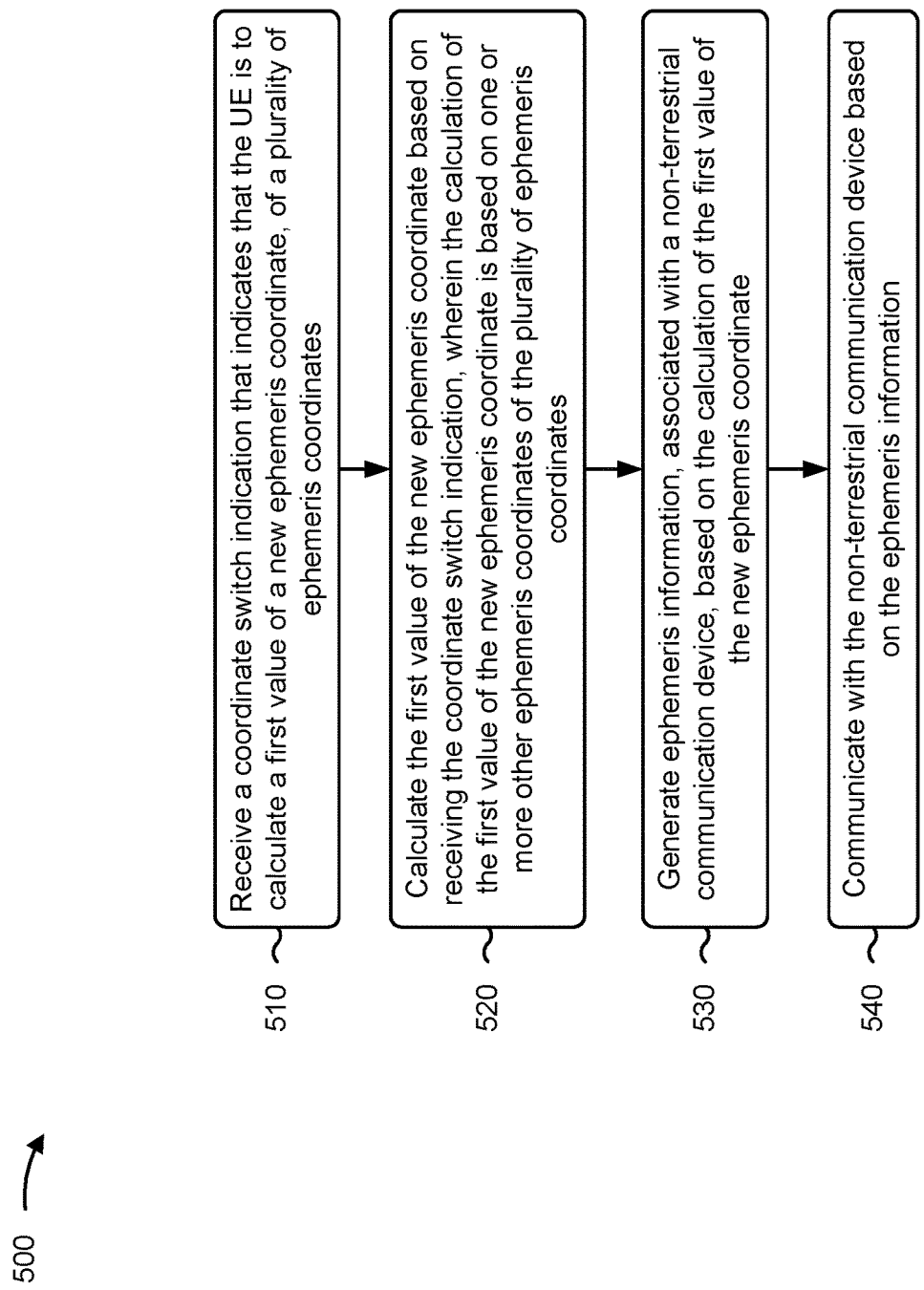
FIGS. 5-14 are diagrams illustrating example processes associated with ephemeris information signaling, in accordance with the present disclosure.

FIG. 5 is a diagram illustrating an example process 500 performed, for example, by a UE, in accordance with the present disclosure. Example process 500 is an example where the UE (e.g., UE 405) performs operations associated with ephemeris information signaling.

As shown in FIG. 5, in some aspects, process 500 may include receiving a coordinate switch indication that indicates that the apparatus is to calculate a first value of a new ephemeris coordinate of a plurality of ephemeris coordinates (block 510). For example, the UE (e.g., using communication manager 140 and/or reception component 1502, depicted in FIG. 15) may receive a coordinate switch indication that indicates that the apparatus is to calculate a first value of a new ephemeris coordinate of a plurality of ephemeris coordinates, as described above.

As further shown in FIG. 5, in some aspects, process 500 may include calculating the first value of the new ephemeris coordinate based on receiving the coordinate switch indication, wherein the calculation of the first value of the new ephemeris coordinate is based on one or more other ephemeris coordinates of the plurality of ephemeris coordinates (block 520). For example, the UE (e.g., using communication manager 140 and/or determination component 1508, depicted in FIG. 15) may calculate the first value of the new ephemeris coordinate based on receiving the coordinate switch indication, wherein the calculation of the first value of the new ephemeris coordinate is based on one or more other ephemeris coordinates of the plurality of ephemeris coordinates, as described above.

As further shown in FIG. 5, in some aspects, process 500 may include generating ephemeris information, associated with a non-terrestrial communication device, based on the calculation of the first value of the new ephemeris coordinate (block 530). For example, the UE (e.g., using communication manager 140 and/or determination component 1508, depicted in FIG. 15) may generate ephemeris information, associated with a non-terrestrial communication device, based on the calculation of the first value of the new ephemeris coordinate, as described above.

As further shown in FIG. 5, in some aspects, process 500 may include communicating with the non-terrestrial communication device based on the ephemeris information (block 540). For example, the UE (e.g., using communication manager 140, reception component 1502, and/or transmission component 1504, depicted in FIG. 15) may communicate with the non-terrestrial communication device based on the ephemeris information, as described above.

Process 500 may include additional aspects, such as any single aspect or any combination of aspects described below and/or in connection with one or more other processes described elsewhere herein.

In a first aspect, the coordinate switch indication is based at least in part on a determination that a prior ephemeris coordinate is associated with an error that satisfies an error threshold.

In a second aspect, alone or in combination with the first aspect, the coordinate switch indication is based at least in part on a determination that an absolute value of a prior ephemeris coordinate fails to satisfy a coordinate threshold.

In a third aspect, alone or in combination with one or more of the first and second aspects, the coordinate switch indication indicates the new ephemeris coordinate.

In a fourth aspect, alone or in combination with the third aspect, the coordinate switch indication is based at least in part on a determination that a second value, different from the first value, of the new ephemeris coordinate has a greater absolute value than one or more absolute values of the one or more other ephemeris coordinates.

In a fifth aspect, alone or in combination with one or more of the first through fourth aspects, the coordinate switch indication comprises one bit.

In a sixth aspect, alone or in combination with the fifth aspect, a first value of the one bit indicates that the apparatus is to calculate the first value of the new ephemeris coordinate.

In a seventh aspect, alone or in combination with the sixth aspect, process 500 includes selecting the second ephemeris coordinate based at least in part on the one bit having the first value, and selecting the new ephemeris coordinate includes selecting the new ephemeris coordinate based at least in part on at least one of a second value, different from the first value, of the new ephemeris coordinate having a greater absolute value than one or more absolute values of the one or more other ephemeris coordinates, or an order of selection.

In an eighth aspect, alone or in combination with one or more of the first through seventh aspects, the coordinate switch indication comprises two bits that indicate the new ephemeris coordinate.

In a ninth aspect, alone or in combination with one or more of the first through eighth aspects, the coordinate switch indication comprises a three bit bitmap that indicates the new ephemeris coordinate.

In a tenth aspect, alone or in combination with one or more of the first through ninth aspects, the plurality of ephemeris coordinates comprises at least one of a position coordinate or a velocity coordinate.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
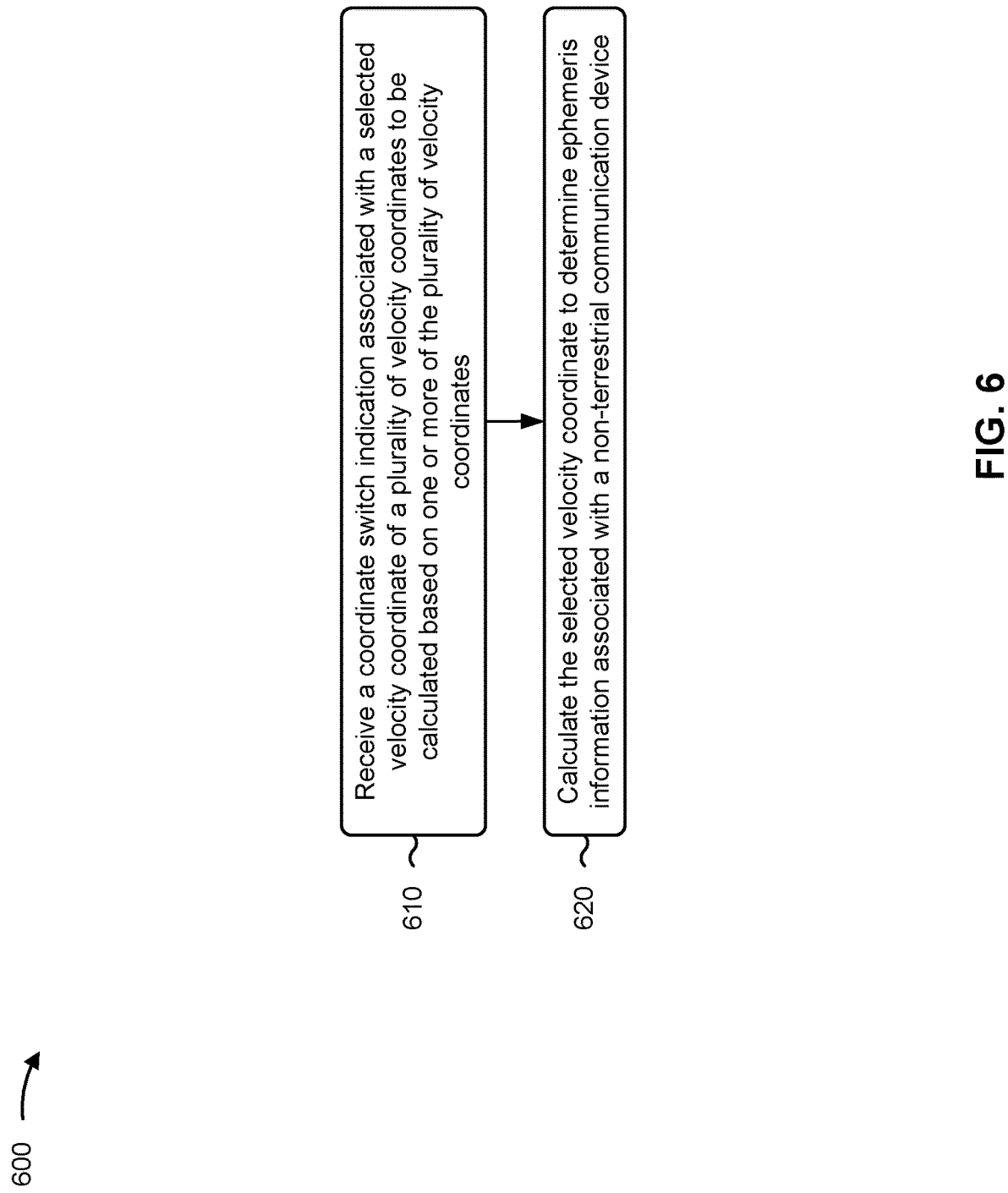

FIG. 6 is a diagram illustrating an example process 600 performed, for example, by a UE, in accordance with the present disclosure. Example process 600 is an example where the UE (e.g., UE 405) performs operations associated with ephemeris information signaling.

As shown in FIG. 6, in some aspects, process 600 may include receiving a coordinate switch indication associated with a selected velocity coordinate of a plurality of velocity coordinates to be calculated based on one or more of the plurality of velocity coordinates (block 610). For example, the UE (e.g., using communication manager 140 and/or reception component 1502, depicted in FIG. 15) may receive a coordinate switch indication associated with a selected velocity coordinate of a plurality of velocity coordinates to be calculated based on one or more of the plurality of velocity coordinates, as described above.

As further shown in FIG. 6, in some aspects, process 600 may include calculating the selected velocity coordinate to determine ephemeris information associated with a non-terrestrial communication device (block 620). For example, the UE (e.g., using communication manager 140 and/or determination component 1508, depicted in FIG. 15) may calculate the selected velocity coordinate to determine ephemeris information associated with a non-terrestrial communication device, as described above.

Process 600 may include additional aspects, such as any single aspect or any combination of aspects described below and/or in connection with one or more other processes described elsewhere herein.

In a first aspect, the coordinate switch indication is based at least in part on a determination that a prior selected velocity coordinate is associated with an error that satisfies an error threshold.

In a second aspect, alone or in combination with the first aspect, the coordinate switch indication is based at least in part on a determination that an absolute value of a prior selected velocity coordinate fails to satisfy a coordinate threshold.

In a third aspect, alone or in combination with one or more of the first and second aspects, the coordinate switch indication is based at least in part on a determination that the selected velocity coordinate has a greater absolute value than one or more absolute values of the one or more of the plurality of velocity coordinates.

In a fourth aspect, alone or in combination with one or more of the first through third aspects, the coordinate switch indication comprises one bit.

In a fifth aspect, alone or in combination with the fourth aspect, the coordinate switch indication indicates that a prior selected velocity coordinate is not to be changed or that the prior selected velocity coordinate is to be changed.

In a sixth aspect, alone or in combination with the fifth aspect, process 600 includes selecting the selected velocity coordinate based at least in part on the coordinate switch indication indicating that the prior selected velocity coordinate is to be changed, wherein selecting the selected velocity coordinate comprises selecting the selected velocity coordinate based at least in part on at least one of a determination that the selected velocity coordinate has a greater absolute value than one or more absolute values of the one or more of the plurality of velocity coordinates, or a pre-determined order of selection.

In a seventh aspect, alone or in combination with one or more of the first through sixth aspects, the coordinate switch indication comprises two bits that indicate the selected velocity coordinate.

In an eighth aspect, alone or in combination with one or more of the first through seventh aspects, the coordinate switch indication comprises a three bit bitmap that indicates the selected velocity coordinate.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
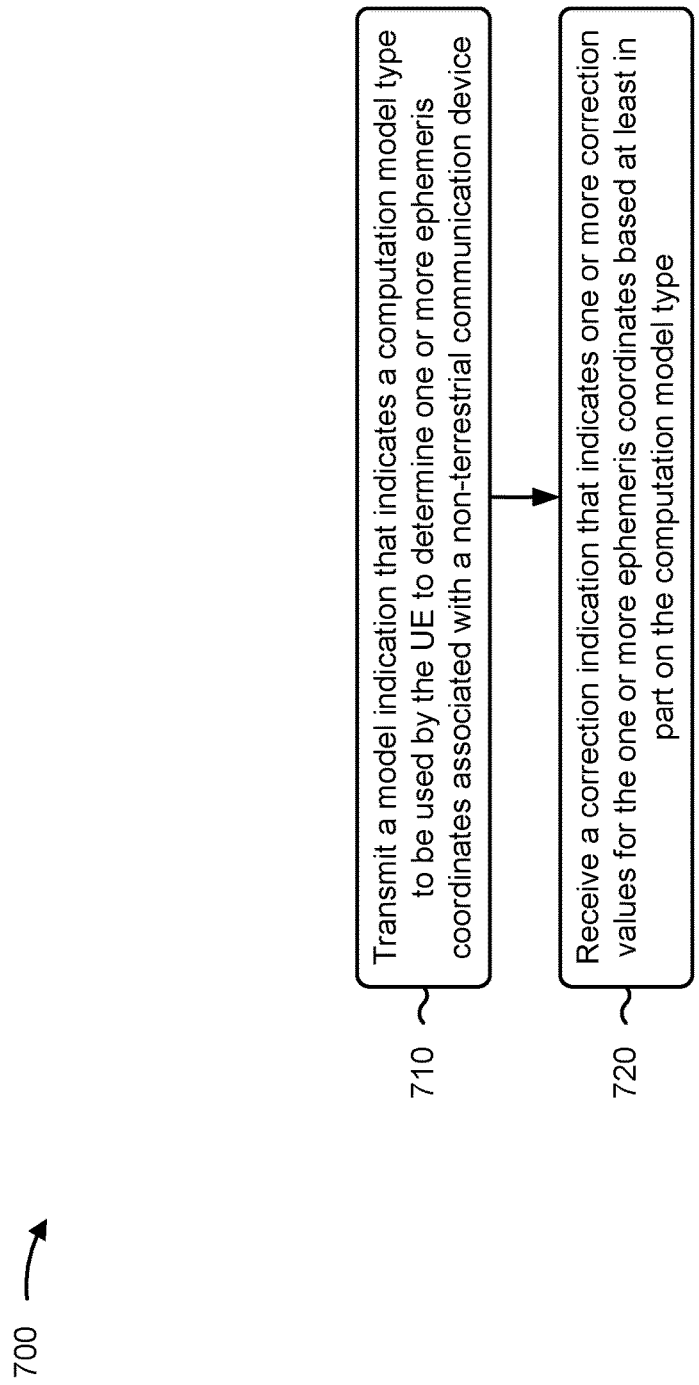

FIG. 7 is a diagram illustrating an example process 700 performed, for example, by a UE, in accordance with the present disclosure. Example process 700 is an example where the UE (e.g., UE 405) performs operations associated with ephemeris information signaling.

As shown in FIG. 7, in some aspects, process 700 may include transmitting a model indication that indicates a computation model type to be used by the UE to determine one or more ephemeris coordinates associated with a non-terrestrial communication device (block 710). For example, the UE (e.g., using communication manager 140 and/or transmission component 1504, depicted in FIG. 15) may transmit a model indication that indicates a computation model type to be used by the UE to determine one or more ephemeris coordinates associated with a non-terrestrial communication device, as described above.

As further shown in FIG. 7, in some aspects, process 700 may include receiving a correction indication that indicates one or more correction values for the one or more ephemeris coordinates based at least in part on the computation model type (block 720). For example, the UE (e.g., using communication manager 140 and/or reception component 1502, depicted in FIG. 15) may receive a correction indication that indicates one or more correction values for the one or more ephemeris coordinates based at least in part on the computation model type, as described above.

Process 700 may include additional aspects, such as any single aspect or any combination of aspects described below and/or in connection with one or more other processes described elsewhere herein.

In a first aspect, process 700 includes calculating the one or more ephemeris coordinates, and determining one or more corrected ephemeris coordinates by applying the one or more correction values to the one or more ephemeris coordinates.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
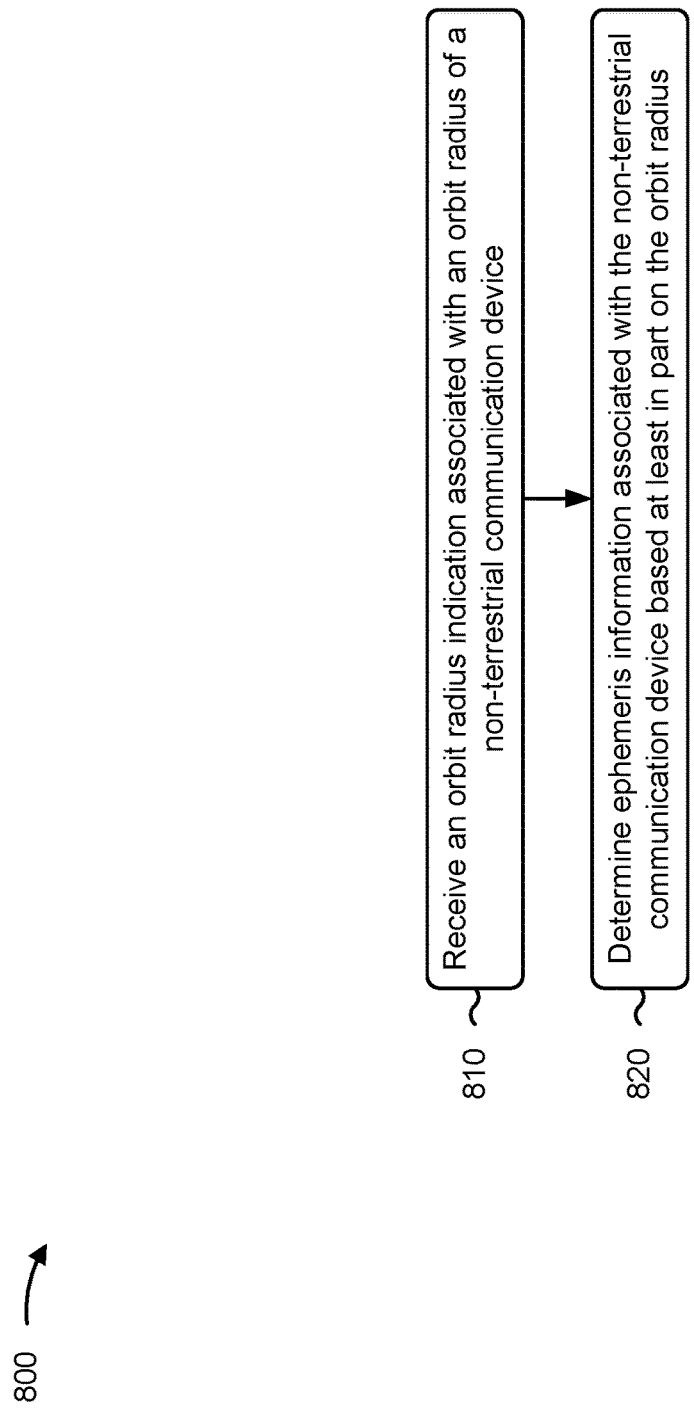

FIG. 8 is a diagram illustrating an example process 800 performed, for example, by a UE, in accordance with the present disclosure. Example process 800 is an example where the UE (e.g., UE 405) performs operations associated with ephemeris information signaling.

As shown in FIG. 8, in some aspects, process 800 may include receiving an orbit radius indication associated with an orbit radius of a non-terrestrial communication device (block 810). For example, the UE (e.g., using communication manager 140 and/or reception component 1502, depicted in FIG. 15) may receive an orbit radius indication associated with an orbit radius of a non-terrestrial communication device, as described above.

As further shown in FIG. 8, in some aspects, process 800 may include determining ephemeris information associated with the non-terrestrial communication device based at least in part on the orbit radius (block 820). For example, the UE (e.g., using communication manager 140 and/or determination component 1508, depicted in FIG. 15) may determine ephemeris information associated with the non-terrestrial communication device based at least in part on the orbit radius, as described above.

Process 800 may include additional aspects, such as any single aspect or any combination of aspects described below and/or in connection with one or more other processes described elsewhere herein.

In a first aspect, the orbit radius indication indicates an orbit range corresponding to the orbit radius, wherein the orbit range includes a range of possible radius values from zero to a maximum orbit value.

In a second aspect, alone or in combination with the first aspect, the orbit radius indication comprises an explicit indication of the orbit radius.

In a third aspect, alone or in combination with the second aspect, the explicit indication comprises at least one of an encoded value based on a uniform quantization or a table of values of radii with non-uniform quantization.

In a fourth aspect, alone or in combination with one or more of the first through third aspects, the orbit radius indication comprises an implicit indication of the orbit radius.

In a fifth aspect, alone or in combination with the fourth aspect, the implicit indication comprises system information associated with at least one of the non-terrestrial communication device, a non-terrestrial network associated with the non-terrestrial communication device, or an additional non-terrestrial communication device associated with the non-terrestrial network.

In a sixth aspect, alone or in combination with one or more of the first through fifth aspects, the orbit radius indication comprises an offset value relative to a length value.

In a seventh aspect, alone or in combination with the sixth aspect, process 800 includes obtaining an indication of the length value.

In an eighth aspect, alone or in combination with the seventh aspect, obtaining the length value comprises at least one of receiving an indication of the length value or obtaining the length value based at least in part on a wireless communication standard.

In a ninth aspect, alone or in combination with the eighth aspect, receiving the indication of the length value comprises receiving at least one of a system information block that includes the length value or a radio resource control message that includes the length value.

In a tenth aspect, alone or in combination with one or more of the sixth through ninth aspects, the length value comprises at least one of a nominal radius of Earth, a mean radius of Earth, an authalic radius of Earth, a volumetric radius of Earth, a rectifying radius of Earth, a global mean radius of curvature of Earth, or an additional offset value.

In an eleventh aspect, alone or in combination with one or more of the sixth through tenth aspects, the orbit radius indication comprises an explicit indication of the offset value or an implicit indication of the offset value.

In a twelfth aspect, alone or in combination with one or more of the first through eleventh aspects, process 800 includes receiving a coordinate indication that indicates at least one of a position coordinate associated with the non-terrestrial communication device or a velocity coordinate associated with the non-terrestrial communication device.

In a thirteenth aspect, alone or in combination with the twelfth aspect, receiving the orbit radius indication comprises receiving a first communication and wherein receiving the coordinate indication comprises receiving a second communication.

In a fourteenth aspect, alone or in combination with the thirteenth aspect, the first communication comprises a first SIB having a first SIB type and wherein the second communication comprises a second SIB having a second SIB type.

In a fifteenth aspect, alone or in combination with one or more of the thirteenth through fourteenth aspects, process 800 includes receiving a first plurality of additional communications comprising a first plurality of additional SIBs having the first SIB type, and receiving a second plurality of additional communications comprising a second plurality of additional SIBs having the second SIB type.

In a sixteenth aspect, alone or in combination with the fifteenth aspect, receiving the first plurality of additional communications comprises receiving the first plurality of additional communications according to a first associated frequency of transmission and wherein receiving the second plurality of additional communications comprises receiving the second plurality of additional communications according to a second associated frequency of transmission.

In a seventeenth aspect, alone or in combination with one or more of the thirteenth through sixteenth aspects, the orbit radius indication comprises an implicit indication and wherein the coordinate indication comprises an explicit indication.

In an eighteenth aspect, alone or in combination with the seventeenth aspect, receiving the orbit radius indication comprises receiving system information during a current communication session with a non-terrestrial network, the method further comprising determining a prior orbit radius during a prior communication session with the non-terrestrial network, and mapping the system information to the prior orbit radius to determine a current orbit radius.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
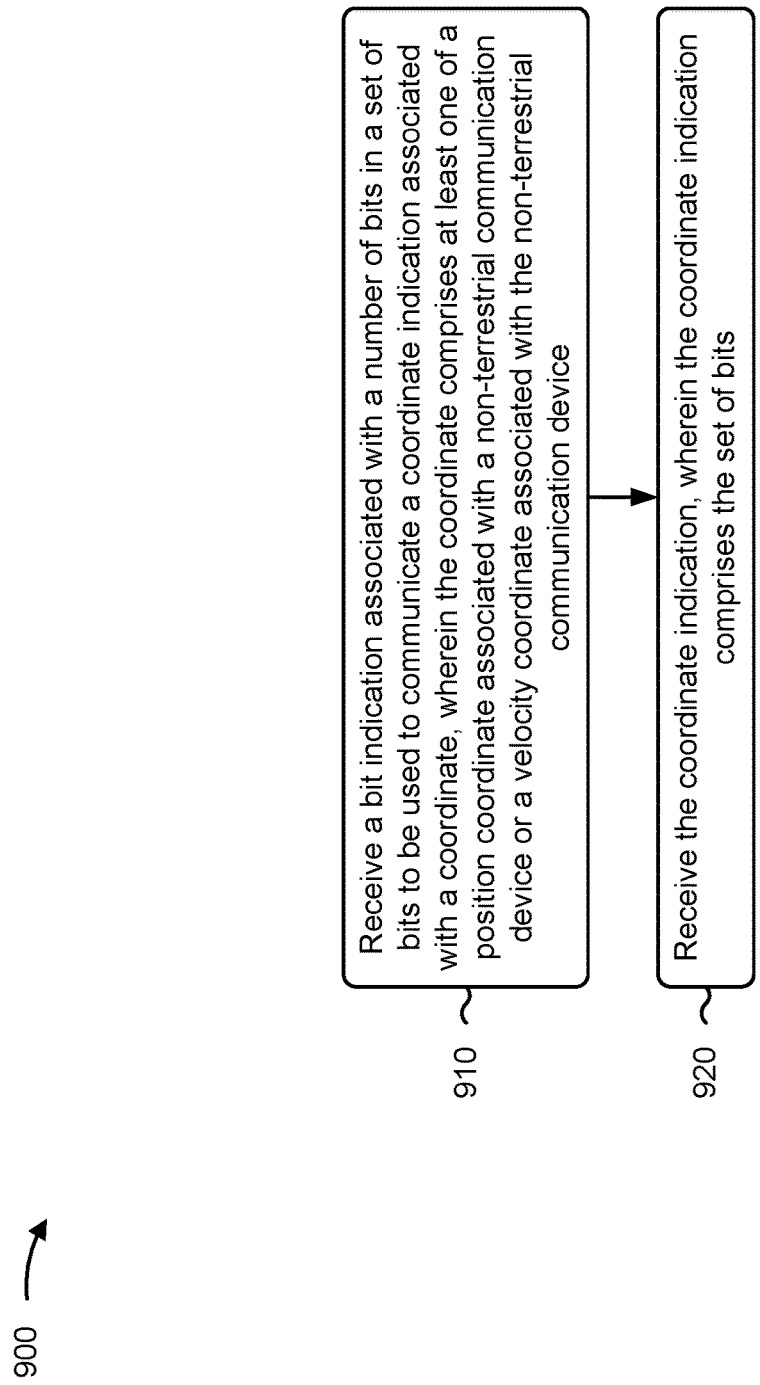

FIG. 9 is a diagram illustrating an example process 900 performed, for example, by a UE, in accordance with the present disclosure. Example process 900 is an example where the UE (e.g., UE 405) performs operations associated with ephemeris information signaling.

As shown in FIG. 9, in some aspects, process 900 may include receiving a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device (block 910). For example, the UE (e.g., using communication manager 140 and/or reception component 1502, depicted in FIG. 15) may receive a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device, as described above.

As further shown in FIG. 9, in some aspects, process 900 may include receiving the coordinate indication, wherein the coordinate indication comprises the set of bits (block 920). For example, the UE (e.g., using communication manager 140 and/or reception component 1502, depicted in FIG. 15) may receive the coordinate indication, wherein the coordinate indication comprises the set of bits, as described above.

Process 900 may include additional aspects, such as any single aspect or any combination of aspects described below and/or in connection with one or more other processes described elsewhere herein.

In a first aspect, the bit indication indicates an offset from a minimum number of bits.

In a second aspect, alone or in combination with the first aspect, the bit indication corresponds to an entry in a bit number table.

In a third aspect, alone or in combination with one or more of the first and second aspects, the coordinate indication comprises an orbit radius indication associated with an orbit radius of the non-terrestrial communication device, the method further comprising determining a maximum value of the coordinate based at least in part on a determination of at least one of a maximum value of the orbit radius and a major semi axis.

In a fourth aspect, alone or in combination with the third aspect, process 900 includes determining a range for the coordinate, wherein the range includes the maximum value of the coordinate and a minimum value of the coordinate, the minimum value of the coordinate comprising a negative of the maximum value of the coordinate.

In a fifth aspect, alone or in combination with the fourth aspect, process 900 includes quantizing the range for the coordinate to determine a quantized range, and mapping the quantized range to a number represented by the set of bits.

In a sixth aspect, two examples are given on mapping the quantized range to a number represented by the set of bits. Let X be the maximum value of a coordinate, the range to be represented by the set of bits be [−X, X], and the number of bits in the set of bits be n. In the first example, the set of n bits $b_{n-1}, \ldots, b_1 b_0$, where $b_{n-1}$ is the most significant bit and $b_0$ is the least significant bit, represents $$\frac{2X}{2^n - 1}(b_{n-1}2^{n-1} + b_{n-2}2^{n-2} + \ldots + b_1 2^1 + b_0),$$

-continued if $b_{n-1} = 0$, and $$-\frac{2X}{2^n-1}\left(2^n - \left(b_{n-1}2^{n-1} + b_{n-2}2^{n-2} + \ldots + b_1 2^1 + b_0\right)\right),$$

if $b_{n-1}=1$. In the second example, the set of n bits $b_{n-1}, \ldots, b_1 b_0$ represents $$\frac{2X}{2^n-1}\left(b_{n-1}2^{n-1} + b_{n-2}2^{n-2} + \ldots + b_1 2^1 + b_0\right) - X.$$

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
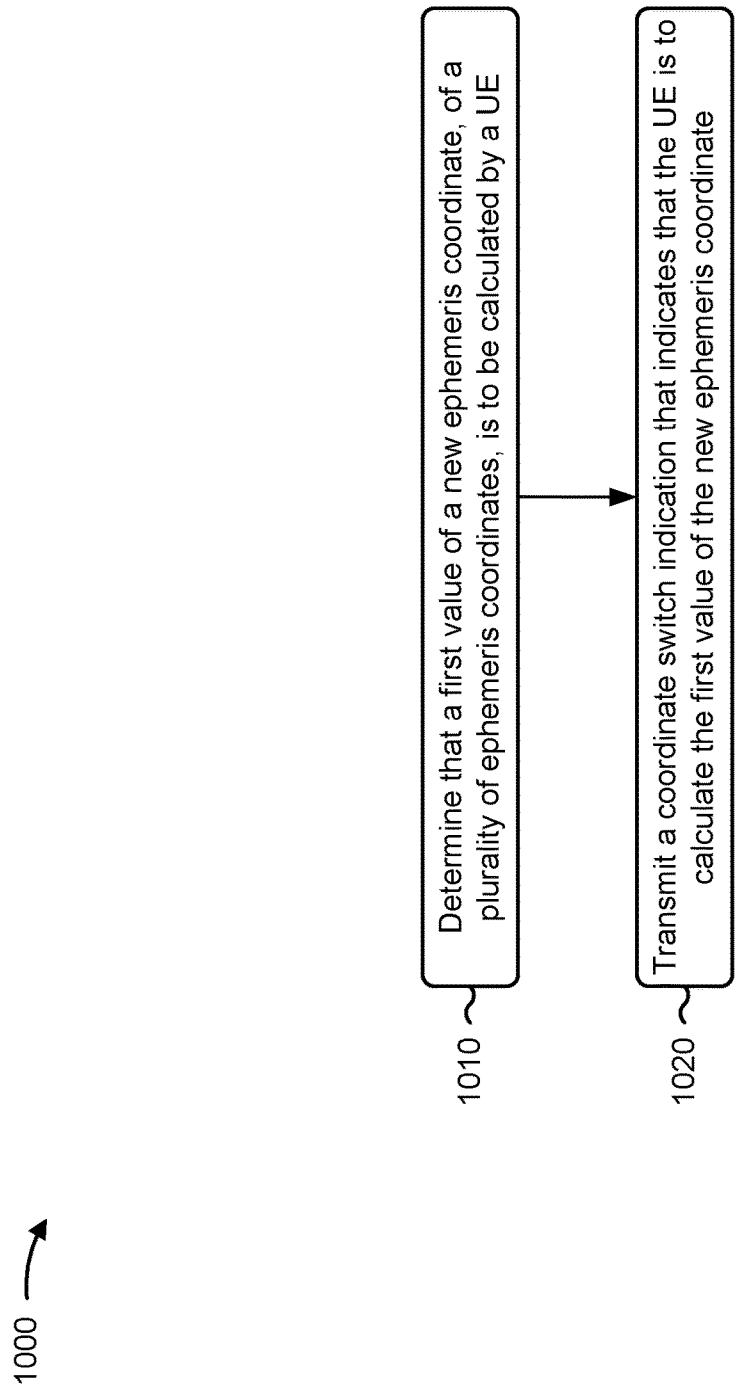

FIG. 10 is a diagram illustrating an example process 1000 performed, for example, by a non-terrestrial communication device, in accordance with the present disclosure. Example process 1000 is an example where the non-terrestrial communication device (e.g., non-terrestrial communication device 410) performs operations associated with ephemeris information signaling.

As shown in FIG. 10, in some aspects, process 1000 may include determining that a first value of a new ephemeris coordinate, of a plurality of ephemeris coordinates, is to be calculated by a UE (block 1010). For example, the non-terrestrial communication device (e.g., using communication manager 150 and/or determination component 1608, depicted in FIG. 16) may determine that a first value of a new ephemeris coordinate, of a plurality of ephemeris coordinates, is to be calculated by a UE, as described above.

As further shown in FIG. 10, in some aspects, process 1000 may include transmitting a coordinate switch indication that indicates that the UE is to calculate the first value of the new ephemeris coordinate (block 1020). For example, the non-terrestrial communication device (e.g., using communication manager 150 and/or transmission component 1604, depicted in FIG. 16) may transmit a coordinate switch indication that indicates that the UE is to calculate the first value of the new ephemeris coordinate, as described above.

Process 1000 may include additional aspects, such as any single aspect or any combination of aspects described below and/or in connection with one or more other processes described elsewhere herein.

In a first aspect, the coordinate switch indication is based at least in part on a determination that a prior ephemeris coordinate is associated with an error that satisfies an error threshold.

In a second aspect, alone or in combination with the first aspect, the coordinate switch indication is based at least in part on a determination that an absolute value of a prior ephemeris coordinate fails to satisfy a coordinate threshold.

In a third aspect, alone or in combination with one or more of the first and second aspects, the coordinate switch indication indicates the new ephemeris coordinate.

In a fourth aspect, alone or in combination with the third aspect, the coordinate switch indication is based at least in part on a determination that a second value, different from the first value, of the new ephemeris coordinate has a greater absolute value than one or more absolute values of the one or more other ephemeris coordinates.

In a fifth aspect, alone or in combination with one or more of the first through fourth aspects, the coordinate switch indication comprises one bit.

In a sixth aspect, alone or in combination with the fifth aspect, a first value of the one bit indicates that the apparatus is to calculate the first value of the new ephemeris coordinate.

In a seventh aspect, alone or in combination with one or more of the first through sixth aspects, the coordinate switch indication comprises two bits that indicate the new ephemeris coordinate.

In an eighth aspect, alone or in combination with one or more of the first through seventh aspects, the coordinate switch indication comprises a three bit bitmap that indicates the new ephemeris coordinate.

In a ninth aspect, alone or in combination with one or more of the first through eighth aspects, the plurality of ephemeris coordinates comprises at least one of a position coordinate or a velocity coordinate.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
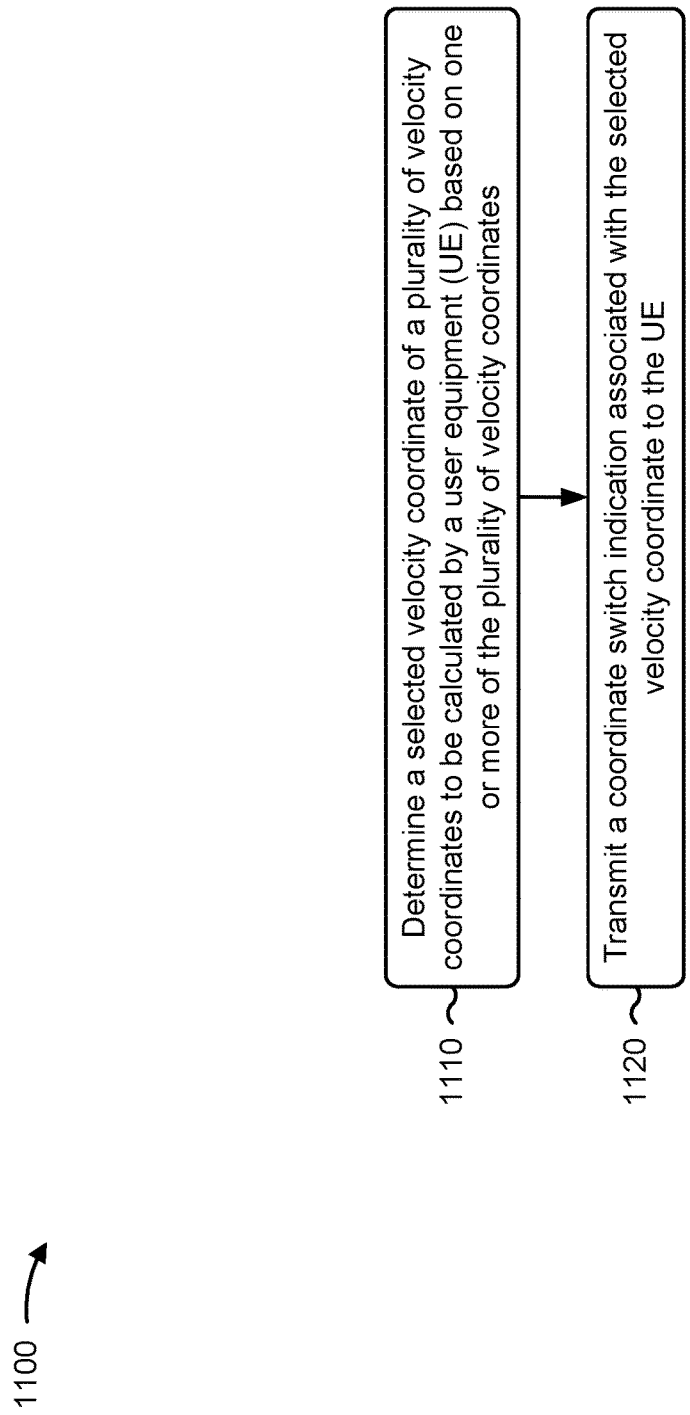

FIG. 11 is a diagram illustrating an example process 1100 performed, for example, by a non-terrestrial communication device, in accordance with the present disclosure. Example process 1100 is an example where the non-terrestrial communication device (e.g., non-terrestrial communication device 410) performs operations associated with ephemeris information signaling.

As shown in FIG. 11, in some aspects, process 1100 may include determining a selected velocity coordinate of a plurality of velocity coordinates to be calculated by a UE based on one or more of the plurality of velocity coordinates (block 1110). For example, the non-terrestrial communication device (e.g., using communication manager 150 and/or determination component 1608, depicted in FIG. 16) may determine a selected velocity coordinate of a plurality of velocity coordinates to be calculated by a UE based on one or more of the plurality of velocity coordinates, as described above.

As further shown in FIG. 11, in some aspects, process 1100 may include transmitting a coordinate switch indication associated with the selected velocity coordinate to the UE (block 1120). For example, the non-terrestrial communication device (e.g., using communication manager 150 and/or transmission component 1604, depicted in FIG. 16) may transmit a coordinate switch indication associated with the selected velocity coordinate to the UE, as described above.

Process 1100 may include additional aspects, such as any single aspect or any combination of aspects described below and/or in connection with one or more other processes described elsewhere herein.

In a first aspect, the coordinate switch indication is based at least in part on a determination that a prior selected velocity coordinate is associated with an error that satisfies an error threshold.

In a second aspect, alone or in combination with the first aspect, the coordinate switch indication is based at least in part on a determination that an absolute value of a prior selected velocity coordinate fails to satisfy a coordinate threshold.

In a third aspect, alone or in combination with one or more of the first and second aspects, the coordinate switch indication is based at least in part on a determination that the selected velocity coordinate has a greater absolute value than one or more absolute values of the one or more of the plurality of velocity coordinates.

In a fourth aspect, alone or in combination with one or more of the first through third aspects, the coordinate switch indication comprises one bit.

In a fifth aspect, alone or in combination with the fourth aspect, the coordinate switch indication indicates that a prior selected velocity coordinate is not to be changed or that the prior selected velocity coordinate is to be changed.

In a sixth aspect, alone or in combination with one or more of the first through fifth aspects, the coordinate switch indication comprises two bits that indicate the selected velocity coordinate.

In a seventh aspect, alone or in combination with one or more of the first through sixth aspects, the coordinate switch indication comprises a three bit bitmap that indicates the selected velocity coordinate.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
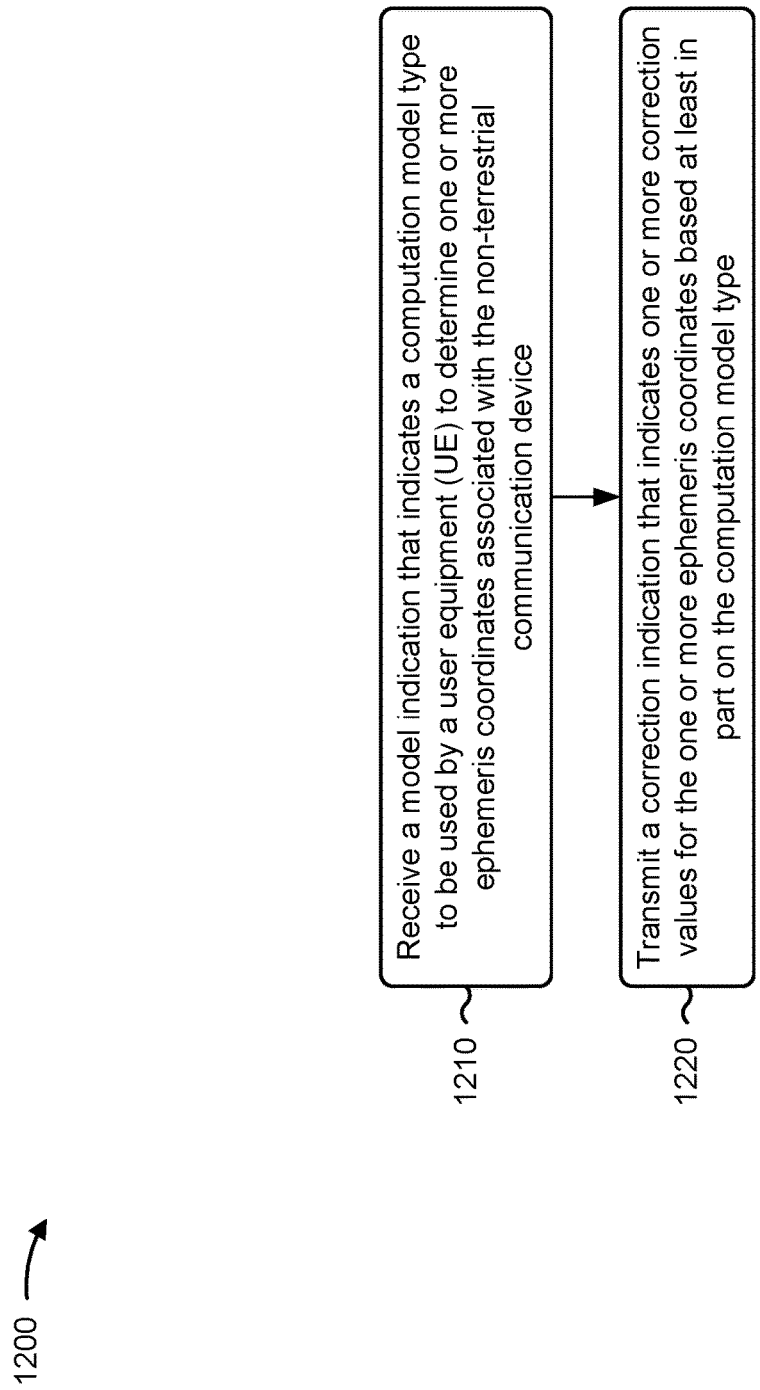

FIG. 12 is a diagram illustrating an example process 1200 performed, for example, by a non-terrestrial communication device, in accordance with the present disclosure. Example process 1200 is an example where the non-terrestrial communication device (e.g., non-terrestrial communication device 410) performs operations associated with ephemeris information signaling.

As shown in FIG. 12, in some aspects, process 1200 may include receiving a model indication that indicates a computation model type to be used by a UE to determine one or more ephemeris coordinates associated with the non-terrestrial communication device (block 1210). For example, the non-terrestrial communication device (e.g., using communication manager 150 and/or reception component 1602, depicted in FIG. 16) may receive a model indication that indicates a computation model type to be used by a UE to determine one or more ephemeris coordinates associated with the non-terrestrial communication device, as described above.

As further shown in FIG. 12, in some aspects, process 1200 may include transmitting a correction indication that indicates one or more correction values for the one or more ephemeris coordinates based at least in part on the computation model type (block 1220). For example, the non-terrestrial communication device (e.g., using communication manager 150 and/or transmission component 1604, depicted in FIG. 16) may transmit a correction indication that indicates one or more correction values for the one or more ephemeris coordinates based at least in part on the computation model type, as described above.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
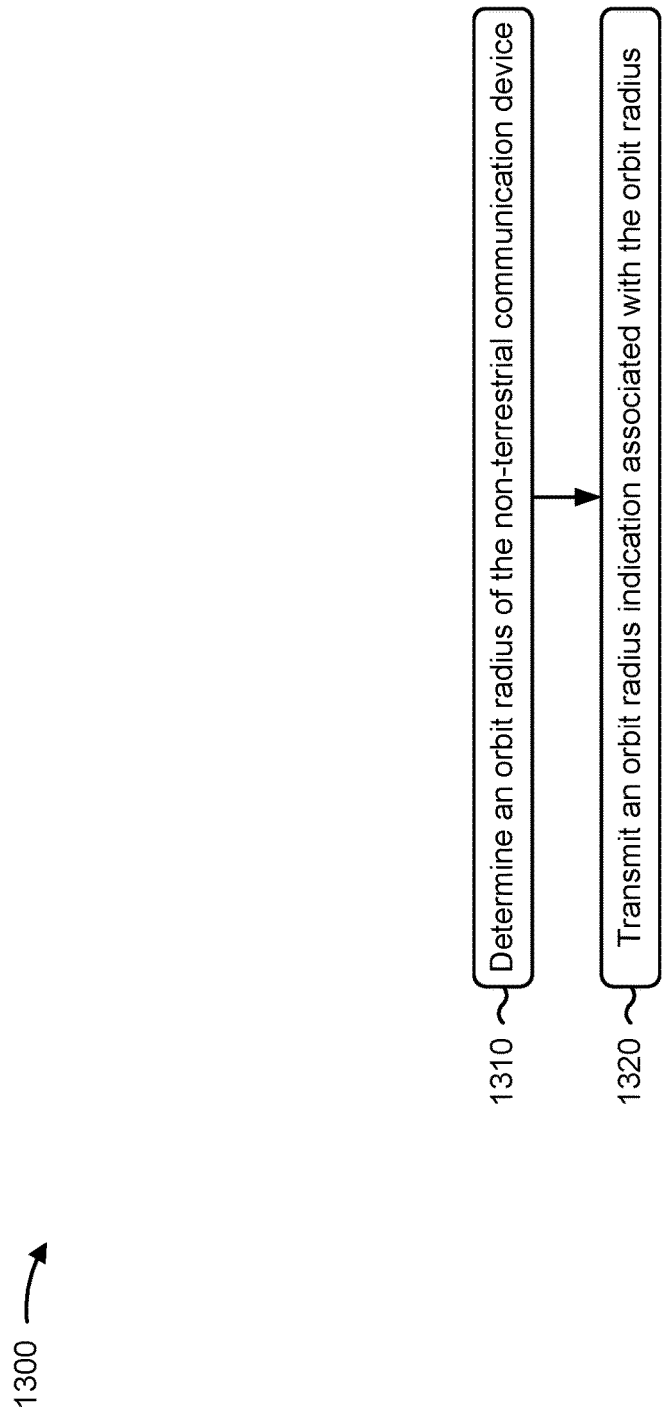

FIG. 13 is a diagram illustrating an example process 1300 performed, for example, by a non-terrestrial communication device, in accordance with the present disclosure. Example process 1300 is an example where the non-terrestrial communication device (e.g., non-terrestrial communication device 410) performs operations associated with ephemeris information signaling.

As shown in FIG. 13, in some aspects, process 1300 may include determining an orbit radius of the non-terrestrial communication device (block 1310). For example, the non-terrestrial communication device (e.g., using communication manager 150 and/or determination component 1608, depicted in FIG. 16) may determine an orbit radius of the non-terrestrial communication device, as described above.

As further shown in FIG. 13, in some aspects, process 1300 may include transmitting an orbit radius indication associated with the orbit radius (block 1320). For example, the non-terrestrial communication device (e.g., using communication manager 150 and/or transmission component 1604, depicted in FIG. 16) may transmit an orbit radius indication associated with the orbit radius, as described above.

Process 1300 may include additional aspects, such as any single aspect or any combination of aspects described below and/or in connection with one or more other processes described elsewhere herein.

In a first aspect, the orbit radius indication indicates an orbit range corresponding to the orbit radius, wherein the orbit range includes a range of possible radius values from zero to a maximum orbit value.

In a second aspect, alone or in combination with the first aspect, the orbit radius indication comprises an explicit indication of the orbit radius.

In a third aspect, alone or in combination with the second aspect, the explicit indication comprises at least one of an encoded value based on a uniform quantization or a table of values of radii with non-uniform quantization.

In a fourth aspect, alone or in combination with one or more of the first through third aspects, the orbit radius indication comprises an implicit indication of the orbit radius.

In a fifth aspect, alone or in combination with the fourth aspect, the implicit indication comprises system information associated with at least one of the non-terrestrial communication device, a non-terrestrial network associated with the non-terrestrial communication device, or an additional non-terrestrial communication device associated with the non-terrestrial network.

In a sixth aspect, alone or in combination with one or more of the first through fifth aspects, the orbit radius indication comprises an offset value relative to a length value.

In a seventh aspect, alone or in combination with the sixth aspect, process 1300 includes transmitting an indication of the length value.

In an eighth aspect, alone or in combination with the seventh aspect, transmitting the indication of the length value comprises transmitting at least one of a system information block that includes the length value or a radio resource control message that includes the length value.

In a ninth aspect, alone or in combination with one or more of the first through eighth aspects, the length value comprises at least one of a nominal radius of Earth, a mean radius of Earth, an authalic radius of Earth, a volumetric radius of Earth, a rectifying radius of Earth, a global mean radius of curvature of Earth, or an additional offset value.

In a tenth aspect, alone or in combination with one or more of the first through ninth aspects, the orbit radius indication comprises an explicit indication of the offset value or an implicit indication of the offset value.

In an eleventh aspect, alone or in combination with one or more of the first through tenth aspects, process 1300 includes transmitting a coordinate indication that indicates at least one of a position coordinate associated with the non-terrestrial communication device or a velocity coordinate associated with the non-terrestrial communication device.

In a twelfth aspect, alone or in combination with the eleventh aspect, transmitting the orbit radius indication comprises transmitting a first communication and wherein transmitting the coordinate indication comprises transmitting a second communication.

In a thirteenth aspect, alone or in combination with the twelfth aspect, the first communication comprises a first SIB having a first SIB type and wherein the second communication comprises a second SIB having a second SIB type.

In a fourteenth aspect, alone or in combination with one or more of the twelfth through thirteenth aspects, process 1300 includes transmitting a first plurality of additional communications comprising a first plurality of additional SIBs having the first SIB type, and transmitting a second plurality of additional communications comprising a second plurality of additional SIBs having the second SIB type.

In a fifteenth aspect, alone or in combination with the fourteenth aspect, transmitting the first plurality of additional communications comprises transmitting the first plurality of additional communications according to a first associated frequency of transmission and wherein transmitting the second plurality of additional communications comprises transmitting the second plurality of additional communications according to a second associated frequency of transmission.

In a sixteenth aspect, alone or in combination with one or more of the twelfth through fifteenth aspects, the orbit radius indication comprises an implicit indication and wherein the coordinate indication comprises an explicit indication.

In a seventeenth aspect, alone or in combination with the sixteenth aspect, transmitting the orbit radius indication comprises transmitting system information during a current communication session with a non-terrestrial network, the method further comprising determining a prior orbit radius during a prior communication session with the non-terrestrial network, and transmitting an indication of the prior orbit radius.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
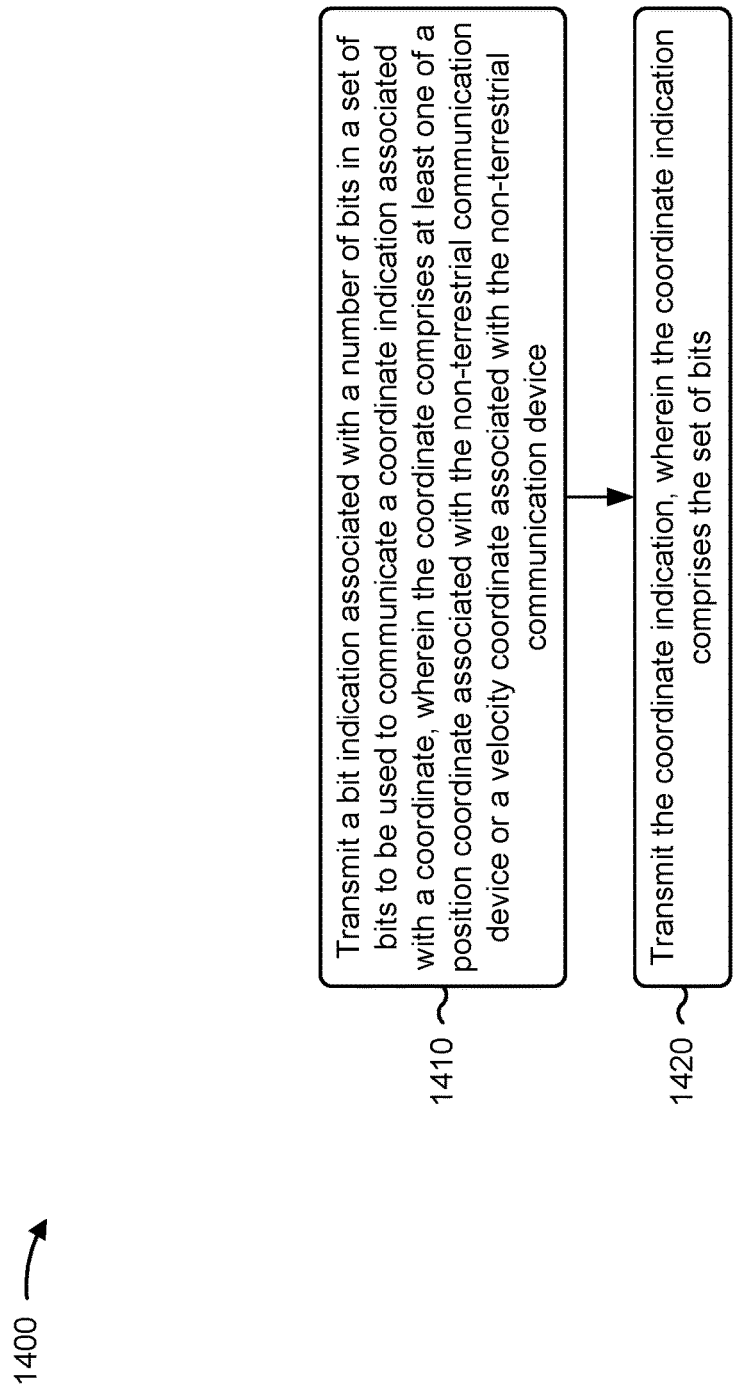

FIG. 14 is a diagram illustrating an example process 1400 performed, for example, by a non-terrestrial communication device, in accordance with the present disclosure. Example process 1400 is an example where the non-terrestrial communication device (e.g., non-terrestrial communication device 410) performs operations associated with ephemeris information signaling.

As shown in FIG. 14, in some aspects, process 1400 may include transmitting a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device (block 1410). For example, the non-terrestrial communication device (e.g.,  using communication manager 150 and/or transmission component 1604, depicted in FIG. 16) may transmit a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device, as described above.

As further shown in FIG. 14, in some aspects, process 1400 may include transmitting the coordinate indication, wherein the coordinate indication comprises the set of bits (block 1420). For example, the non-terrestrial communication device (e.g., using communication manager 150 and/or transmission component 1604, depicted in FIG. 16) may transmit the coordinate indication, wherein the coordinate indication comprises the set of bits, as described above.

Process 1400 may include additional aspects, such as any single aspect or any combination of aspects described below and/or in connection with one or more other processes described elsewhere herein.

In a first aspect, the bit indication indicates an offset from a minimum number of bits.

In a second aspect, alone or in combination with the first aspect, the bit indication corresponds to an entry in a bit number table.

In a third aspect, alone or in combination with one or more of the first and second aspects, the coordinate indication comprises an orbit radius indication associated with an orbit radius of the non-terrestrial communication device.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
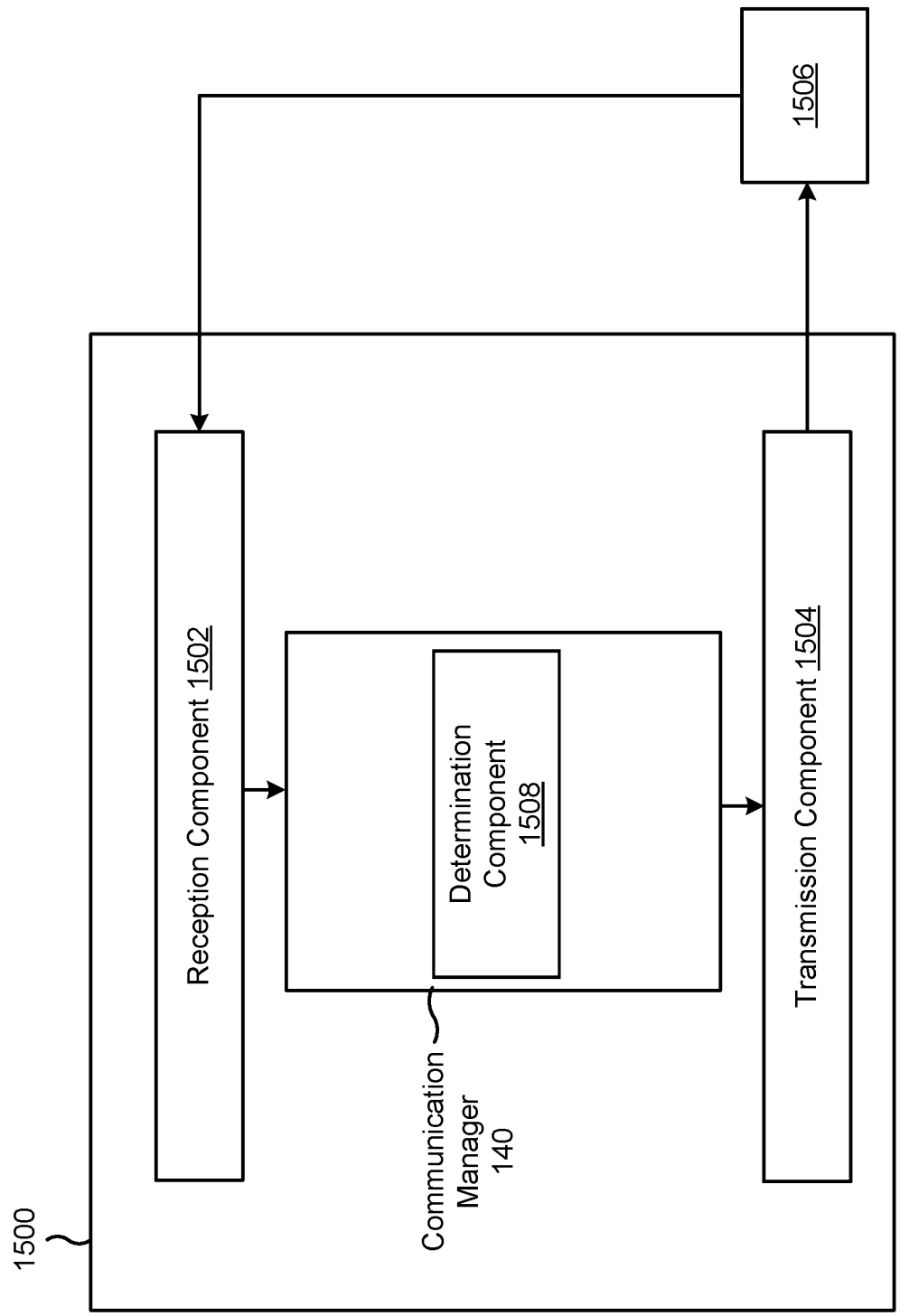
FIGS. 15 and 16 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a network node, or another wireless communication device) using the reception component 1502 and the transmission component 1504. As further shown, the apparatus 1500 may include the communication manager 140. The communication manager 140 may include a determination component 1508.

In some aspects, the apparatus 1500 may be configured to perform one or more operations described herein in connection with FIG. 4. Additionally, or alternatively, the apparatus 1500 may be configured to perform one or more processes described herein, such as process 500 of FIG. 5, process 600 of FIG. 6, process 700 of FIG. 7, process 800 of FIG. 8, process 900 of FIG. 9, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The communication manager 140 and/or the determination component 1508 may calculate a first ephemeris coordinate of a plurality of ephemeris coordinates. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 1502 and/or the transmission component 1504. In some aspects, the determination component 1508 may include one or more antennas, a modem, a modulator, a transmit MIMO processor, a transmit processor, a controller/processor, a memory, or a combination thereof, of the UE described in connection with FIG. 2. In some aspects, the determination component 1508 may include the reception component 1502 and/or the transmission component 1504.

The communication manager 140 and/or the determination component 1408 may generate first ephemeris information, associated with a non-terrestrial communication device, based on the calculation of the first ephemeris coordinate. The communication manager 140, the reception component 1502, and/or the transmission component 1504 may communicate with the non-terrestrial communication device based on the first ephemeris information The reception component 1502 may receive a coordinate switch indication that indicates that the apparatus is to calculate an ephemeris coordinate, of the plurality of ephemeris coordinates, other than the first ephemeris coordinate. The communication manager 140 and/or the determination component 1508 may calculate a second ephemeris coordinate based on receiving the coordinate switch indication, wherein the calculation of the second ephemeris coordinate is based on one or more other ephemeris coordinates of the plurality of ephemeris coordinates. The communication manager 140 and/or the determination component 1508 may generate second ephemeris information, associated with a non-terrestrial communication device, based on the calculation of the second ephemeris coordinate. The communication manager 140, the reception component 1502, and/or the transmission component 1504 may communicate with the non-terrestrial communication device based on the second ephemeris information.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for selecting, means for calculating, or means for generating may include various processing system components, such as a receive processor, a transmit processor, a controller/processor, a memory, or a combination thereof, of the UE described above in connection with FIG. 2.

The communication manager 140 and/or the determination component 1508 may select the selected position coordinate based at least in part on the coordinate switch indication indicating that the prior selected position coordinate is to be changed, wherein selecting the selected position coordinate comprises selecting the selected position coordinate based at least in part on at least one of a determination that the selected position coordinate has a greater absolute value than one or more absolute values of the one or more of the plurality of position coordinates, or a pre-determined order of selection.

The reception component 1502 may receive a coordinate switch indication associated with a selected velocity coordinate of a plurality of velocity coordinates to be calculated based on one or more of the plurality of velocity coordinates. The communication manager 140 and/or the determination component 1508 may calculate the selected velocity coordinate to determine ephemeris information associated with a non-terrestrial communication device.

The communication manager 140 and/or the determination component 1508 may select the selected velocity coordinate based at least in part on the coordinate switch indication indicating that the prior selected velocity coordinate is to be changed, wherein selecting the selected velocity coordinate comprises selecting the selected velocity coordinate based at least in part on at least one of a determination that the selected velocity coordinate has a greater absolute value than one or more absolute values of the one or more of the plurality of velocity coordinates, or a pre-determined order of selection.

The transmission component 1504 may transmit a model indication that indicates a computation model type to be used by the UE to determine one or more ephemeris coordinates associated with a non-terrestrial communication device. The reception component 1502 may receive a correction indication that indicates one or more correction values for the one or more ephemeris coordinates based at least in part on the computation model type.

The communication manager 140 and/or the determination component 1508 may calculate the one or more ephemeris coordinates. The determination component 1508 may determine one or more corrected ephemeris coordinates by applying the one or more correction values to the one or more ephemeris coordinates.

The reception component 1502 may receive an orbit radius indication associated with an orbit radius of a non-terrestrial communication device. The determination component 1508 may determine ephemeris information associated with the non-terrestrial communication device based at least in part on the orbit radius.

The communication manager 140 and/or the determination component 1508 may obtain an indication of the length value. The reception component 1502 may receive a coordinate indication that indicates at least one of a position coordinate associated with the non-terrestrial communication device or a velocity coordinate associated with the non-terrestrial communication device.

The reception component 1502 may receive a first plurality of additional communications comprising a first plurality of additional SIBs having the first SIB type. The reception component 1502 may receive a second plurality of additional communications comprising a second plurality of additional SIBs having the second SIB type.

The reception component 1502 may receive a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device. The reception component 1502 may receive the coordinate indication, wherein the coordinate indication comprises the set of bits.

The determination component 1508 may determine a range for the coordinate, wherein the range includes the maximum value of the coordinate and a minimum value of the coordinate, the minimum value of the coordinate comprising a negative of the maximum value of the coordinate. The transmission component 1504 may quantize the range for the coordinate to determine a quantized range. The transmission component 1504 may map the quantized range to a number represented by the set of bits.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
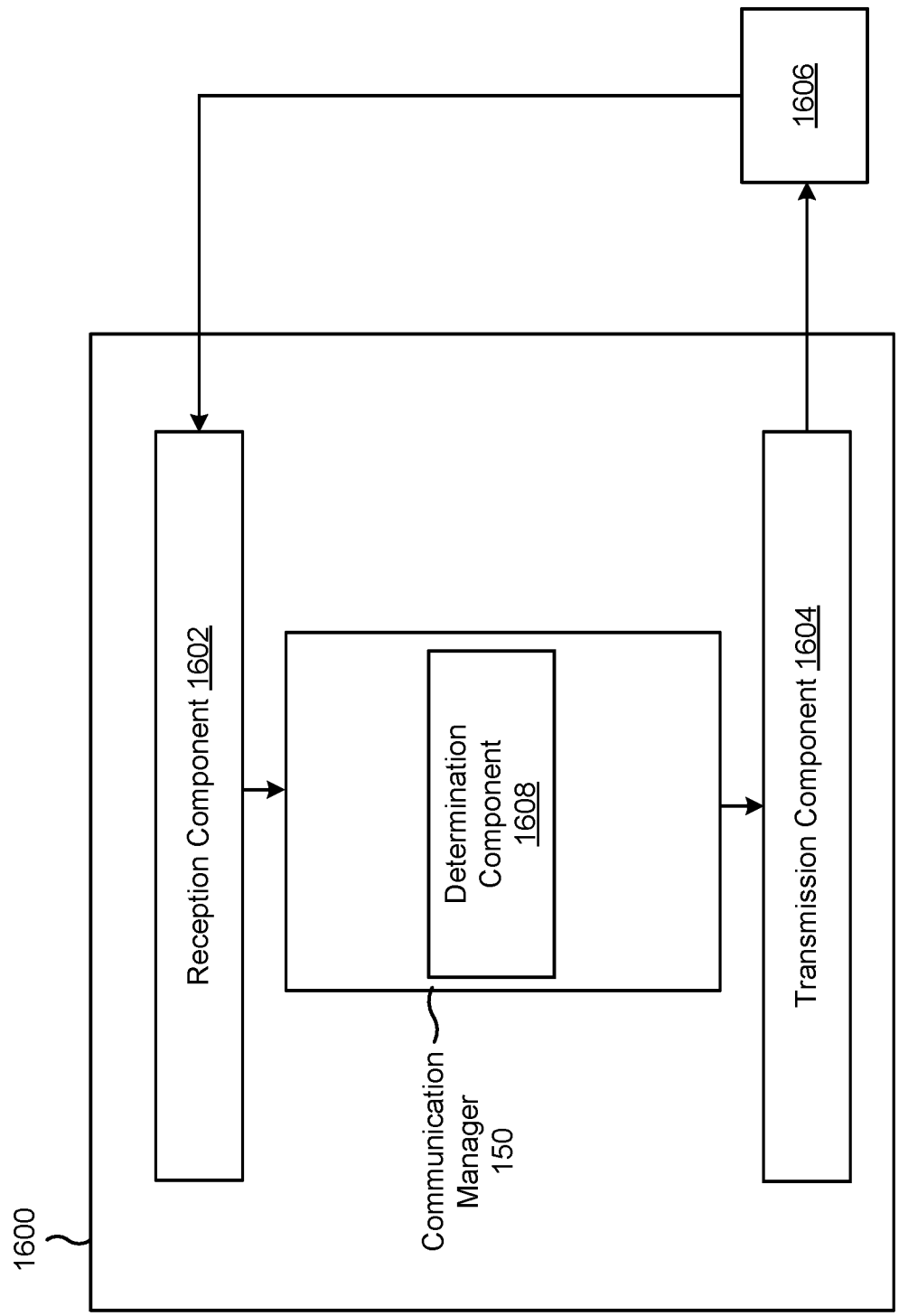

FIG. 16 is a diagram of an example apparatus 1600 for wireless communication. The apparatus 1600 may be a non-terrestrial communication device, or a non-terrestrial communication device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a network node, or another wireless communication device) using the reception component 1602 and the transmission component 1604. As further shown, the apparatus 1600 may include the communication manager 150. The communication manager 150 may include a determination component 1608.

In some aspects, the apparatus 1600 may be configured to perform one or more operations described herein in connection with FIG. 4. Additionally, or alternatively, the apparatus 1600 may be configured to perform one or more processes described herein, such as process 1000 of FIG. 10, process 1100 of FIG. 11, process 1200 of FIG. 12, process 1300 of FIG. 13, process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The communication manager 150 and/or determination component 1608 may determine that an ephemeris coordinate, of a plurality of ephemeris coordinates, other than a first ephemeris coordinate of the plurality of ephemeris coordinates, is to be calculated by a UE. In some aspects, the communication manager 150 may include one or more antennas, a modem, a modulator, a transmit MIMO processor, a transmit processor, a controller/processor, a memory, or a combination thereof, of the network node described in connection with FIG. 2. In some aspects, the communication manager 150 may include the reception component 1602 and/or the transmission component 1604. In some aspects, the determination component 1608 may include one or more antennas, a modem, a modulator, a transmit MIMO processor, a transmit processor, a controller/processor, a memory, or a combination thereof, of the network node described in connection with FIG. 2. In some aspects, the determination component 1608 may include the reception component 1602 and/or the transmission component 1604.

The communication manager 150 and/or the transmission component 1604 may transmit a coordinate switch indication that indicates that the UE is to calculate the ephemeris coordinate other than the first ephemeris coordinate. The communication manager 150 and/or the determination component 1608 may determine a selected position coordinate of a plurality of position coordinates to be calculated by a UE based on one or more of the plurality of position coordinates.

The determination component 1608 may determine a selected velocity coordinate of a plurality of velocity coordinates to be calculated by a UE based on one or more of the plurality of velocity coordinates. The transmission component 1604 may transmit a coordinate switch indication associated with the selected velocity coordinate to the UE.

In some examples, means for transmitting, outputting, or sending (or means for outputting for transmission) may include one or more antennas, a modulator, a transmit MIMO processor, a transmit processor, or a combination thereof, of the network node described above in connection with FIG. 2.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for selecting, means for calculating, or means for generating may include various processing system components, such as a receive processor, a transmit processor, a controller/processor, a memory, or a combination thereof, of the network node described above in connection with FIG. 2.

The reception component 1602 may receive a model indication that indicates a computation model type to be used by a UE to determine one or more ephemeris coordinates associated with the non-terrestrial communication device. The transmission component 1604 may transmit a correction indication that indicates one or more correction values for the one or more ephemeris coordinates based at least in part on the computation model type.

The determination component 1608 may determine an orbit radius of the non-terrestrial communication device. The transmission component 1604 may transmit an orbit radius indication associated with the orbit radius.

The transmission component 1604 may transmit an indication of the length value.

The transmission component 1604 may transmit a coordinate indication that indicates at least one of a position coordinate associated with the non-terrestrial communication device or a velocity coordinate associated with the non-terrestrial communication device.

The transmission component 1604 may transmit a first plurality of additional communications comprising a first plurality of additional SIBs having the first SIB type.

The transmission component 1604 may transmit a second plurality of additional communications comprising a second plurality of additional SIBs having the second SIB type.

The transmission component 1604 may transmit a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device. The transmission component 1604 may transmit the coordinate indication, wherein the coordinate indication comprises the set of bits.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
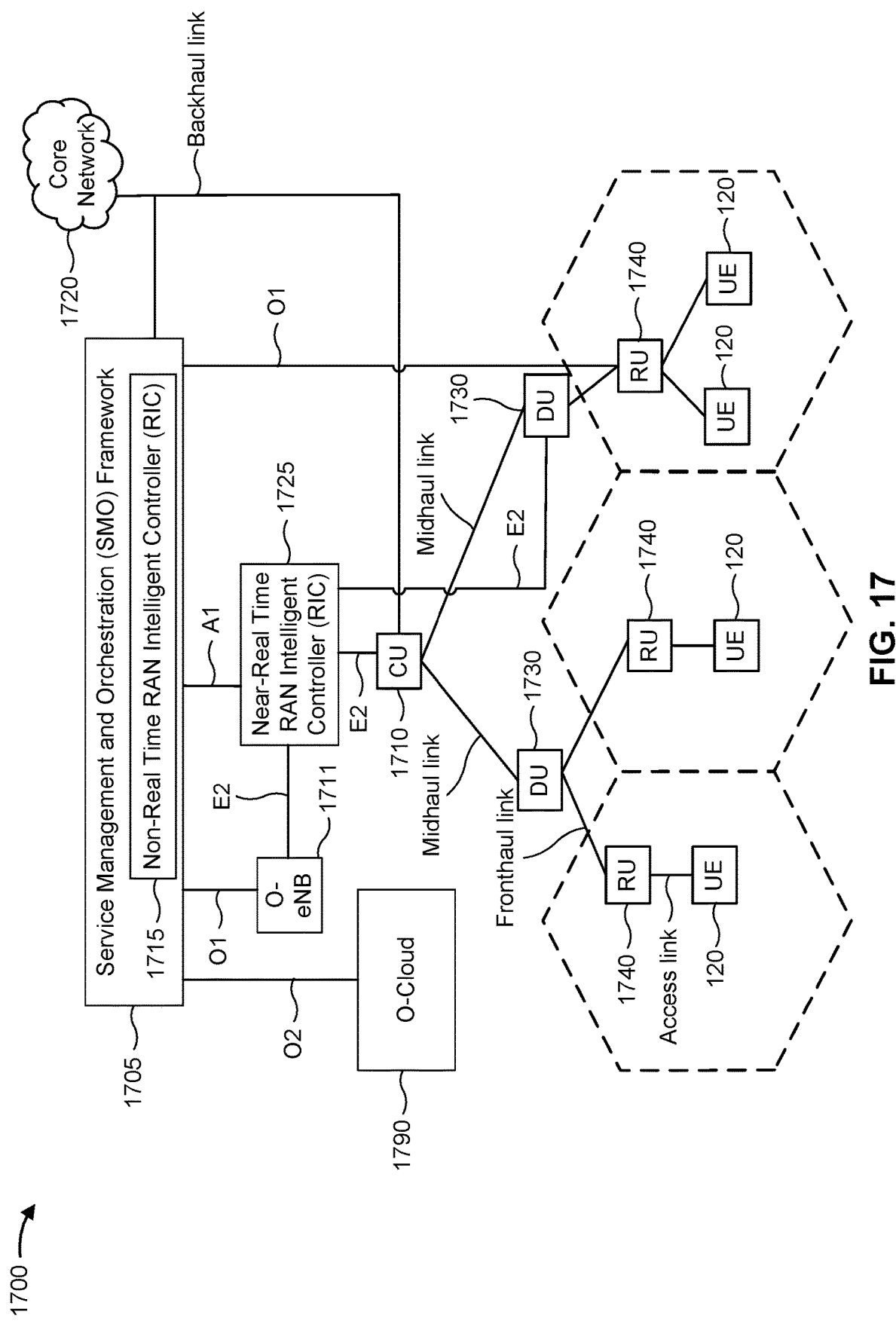
FIG. 17 is a diagram illustrating an example of a disaggregated base station architecture, in accordance with the present disclosure.

FIG. 17 is a diagram illustrating an example disaggregated base station architecture 1700, in accordance with the present disclosure. The disaggregated base station architecture 1700 may include a CU 1710 that can communicate directly with a core network 1720 via a backhaul link, or indirectly with the core network 1720 through one or more disaggregated control units (such as a Near-RT RIC 1725 via an E2 link, or a Non-RT RIC 1715 associated with a Service Management and Orchestration (SMO) Framework 1705, or both). A CU 1710 may communicate with one or more DUs 1730 via respective midhaul links, such as through F1 interfaces. Each of the DUs 1730 may communicate with one or more RUs 1740 via respective fronthaul links. Each of the RUs 1740 may communicate with one or more UEs 120 via respective radio frequency (RF) access links. In some implementations, a UE 120 may be simultaneously served by multiple RUs 1740.

Each of the units, including the CUs 1710, the DUs 1730, the RUs 1740, as well as the Near-RT RICs 1725, the Non-RT RICs 1715, and the SMO Framework 1705, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1710 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 1710. The CU 1710 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1710 can be logically split into one or more CU-UP units and one or more CU-CP units. A CU-UP unit can communicate bidirectionally with a CU-CP unit via an interface, such as the E1 interface when implemented in an O-RAN configuration. The CU 1710 can be implemented to communicate with a DU 1730, as necessary, for network control and signaling.

Each DU 1730 may correspond to a logical unit that includes one or more base station functions to control the operation of one or more RUs 1740. In some aspects, the DU 1730 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1730 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1730, or with the control functions hosted by the CU 1710.

Each RU 1740 may implement lower-layer functionality. In some deployments, an RU 1740, controlled by a DU 1730, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1740 can be operated to handle over the air (OTA) communication with one or more UEs 120. In some implementations, real-time and non-real-time aspects of control and user plane communication with the RU(s) 1740 can be controlled by the corresponding DU 1730. In some scenarios, this configuration can enable each DU 1730 and the CU 1710 to be implemented in a cloud-based RAN architecture, such as a vRAN architecture.

The SMO Framework 1705 may be configured to support RAN deployment and provisioning of non-virtualized and virtualized network elements. For non-virtualized network elements, the SMO Framework 1705 may be configured to support the deployment of dedicated physical resources for RAN coverage requirements, which may be managed via an operations and maintenance interface (such as an O1 interface). For virtualized network elements, the SMO Framework 1705 may be configured to interact with a cloud computing platform (such as an open cloud (O-Cloud) platform 1790) to perform network element life cycle management (such as to instantiate virtualized network elements) via a cloud computing platform interface (such as an O2 interface). Such virtualized network elements can include, but are not limited to, CUs 1710, DUs 1730, RUs 1740, non-RT RICs 1715, and Near-RT RICs 1725. In some implementations, the SMO Framework 1705 can communicate with a hardware aspect of a 4G RAN, such as an open eNB (O-eNB) 1711, via an O1 interface. Additionally, in some implementations, the SMO Framework 1705 can communicate directly with each of one or more RUs 1740 via a respective O1 interface. The SMO Framework 1705 also may include a Non-RT RIC 1715 configured to support functionality of the SMO Framework 1705.

The Non-RT RIC 1715 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1725. The Non-RT RIC 1715 may be coupled to or communicate with (such as via an A1 interface) the Near-RT RIC 1725. The Near-RT RIC 1725 may be configured to include a logical function that enables near-real-time control and optimization of RAN elements and resources via data collection and actions over an interface (such as via an E2 interface) connecting one or more CUs 1710, one or more DUs 1730, or both, as well as an O-eNB, with the Near-RT RIC 1725.

In some implementations, to generate AI/ML models to be deployed in the Near-RT RIC 1725, the Non-RT RIC 1715 may receive parameters or external enrichment information from external servers. Such information may be utilized by the Near-RT RIC 1725 and may be received at the SMO Framework 1705 or the Non-RT RIC 1715 from non-network data sources or from network functions. In some examples, the Non-RT RIC 1715 or the Near-RT RIC 1725 may be configured to tune RAN behavior or performance. For example, the Non-RT RIC 1715 may monitor long-term trends and patterns for performance and employ AI/ML models to perform corrective actions through the SMO Framework 1705 (such as reconfiguration via an O1 interface) or via creation of RAN management policies (such as A1 interface policies).

As indicated above, FIG. 17 is provided as an example. Other examples may differ from what is described with regard to FIG. 17.

The following provides an overview of some Aspects of the present disclosure:

Aspect 1: A method of wireless communication performed at a user equipment (UE), comprising: receiving a coordinate switch indication associated with a selected position coordinate of a plurality of position coordinates to be calculated based on one or more of the plurality of position coordinates; and calculating the selected position coordinate to determine ephemeris information associated with a non-terrestrial communication device.

Aspect 2: The method of Aspect 1, wherein the coordinate switch indication is based at least in part on a determination that a prior selected position coordinate is associated with an error that satisfies an error threshold.

Aspect 3: The method of either of Aspects 1 or 2, wherein the coordinate switch indication is based at least in part on a determination that an absolute value of a prior selected position coordinate fails to satisfy a coordinate threshold.

Aspect 4: The method of any of Aspects 1-3, wherein the coordinate switch indication is based at least in part on a determination that the selected position coordinate has a greater absolute value than one or more absolute values of the one or more of the plurality of position coordinates.

Aspect 5: The method of any of Aspects 1-4, wherein the coordinate switch indication comprises one bit.

Aspect 6: The method of Aspect 5, wherein the coordinate switch indication indicates that a prior selected position coordinate is not to be changed or that the prior selected position coordinate is to be changed.

Aspect 7: The method of Aspect 6, further comprising selecting the selected position coordinate based at least in part on the coordinate switch indication indicating that the prior selected position coordinate is to be changed, wherein selecting the selected position coordinate comprises selecting the selected position coordinate based at least in part on at least one of: a determination that the selected position coordinate has a greater absolute value than one or more absolute values of the one or more of the plurality of position coordinates, or a pre-determined order of selection.

Aspect 8: The method of any of Aspects 1-7, wherein the coordinate switch indication comprises two bits that indicate the selected position coordinate.

Aspect 9: The method of any of Aspects 1-8, wherein the coordinate switch indication comprises a three bit bitmap that indicates the selected position coordinate.

Aspect 10: A method of wireless communication performed at a user equipment (UE), comprising: receiving a coordinate switch indication associated with a selected velocity coordinate of a plurality of velocity coordinates to be calculated based on one or more of the plurality of velocity coordinates; and calculating the selected velocity coordinate to determine ephemeris information associated with a non-terrestrial communication device.

Aspect 11: The method of Aspect 10, wherein the coordinate switch indication is based at least in part on a determination that a prior selected velocity coordinate is associated with an error that satisfies an error threshold.

Aspect 12: The method of either of Aspects 10 or 11, wherein the coordinate switch indication is based at least in part on a determination that an absolute value of a prior selected velocity coordinate fails to satisfy a coordinate threshold.

Aspect 13: The method of any of Aspects 10-12, wherein the coordinate switch indication is based at least in part on a determination that the selected velocity coordinate has a greater absolute value than one or more absolute values of the one or more of the plurality of velocity coordinates.

Aspect 14: The method of any of Aspects 10-13, wherein the coordinate switch indication comprises one bit.

Aspect 15: The method of Aspect 14, wherein the coordinate switch indication indicates that a prior selected velocity coordinate is not to be changed or that the prior selected velocity coordinate is to be changed.

Aspect 16: The method of Aspect 15, further comprising selecting the selected velocity coordinate based at least in part on the coordinate switch indication indicating that the prior selected velocity coordinate is to be changed, wherein selecting the selected velocity coordinate comprises selecting the selected velocity coordinate based at least in part on at least one of: a determination that the selected velocity coordinate has a greater absolute value than one or more absolute values of the one or more of the plurality of velocity coordinates, or a pre-determined order of selection.

Aspect 17: The method of any of Aspects 10-16, wherein the coordinate switch indication comprises two bits that indicate the selected velocity coordinate.

Aspect 18: The method of any of Aspects 10-17, wherein the coordinate switch indication comprises a three bit bitmap that indicates the selected velocity coordinate.

Aspect 19: A method of wireless communication performed at a user equipment (UE), comprising: transmitting a model indication that indicates a computation model type to be used by the UE to determine one or more ephemeris coordinates associated with a non-terrestrial communication device; and receiving a correction indication that indicates one or more correction values for the one or more ephemeris coordinates based at least in part on the computation model type.

Aspect 20: The method of Aspect 19, further comprising: calculating the one or more ephemeris coordinates; and determining one or more corrected ephemeris coordinates by applying the one or more correction values to the one or more ephemeris coordinates.

Aspect 21: A method of wireless communication performed at a user equipment (UE), comprising: receiving an orbit radius indication associated with an orbit radius of a non-terrestrial communication device; determining the orbit radius based on the orbit radius indication; generating ephemeris information associated with the non-terrestrial communication device based on the determined orbit radius; and communicating with the non-terrestrial communication device based on the ephemeris information.

Aspect 22: The method of Aspect 21, wherein the orbit radius indication indicates an orbit range corresponding to the orbit radius, wherein the orbit range includes a range of possible radius values from zero to a maximum orbit value.

Aspect 23: The method of either of Aspects 21 or 22, wherein the orbit radius indication comprises an explicit indication of the orbit radius.

Aspect 24: The method of Aspect 23, wherein the explicit indication comprises at least one of an encoded value based on a uniform quantization or a table of values of radii with non-uniform quantization.

Aspect 25: The method of any of Aspects 21-24, wherein the orbit radius indication comprises an implicit indication of the orbit radius.

Aspect 26: The method of Aspect 25, wherein the implicit indication comprises system information associated with at least one of the non-terrestrial communication device, a non-terrestrial network associated with the non-terrestrial communication device, or an additional non-terrestrial communication device associated with the non-terrestrial network.

Aspect 27: The method of any of Aspects 21-26, wherein the orbit radius indication comprises an offset value relative to a length value.

Aspect 28: The method of Aspect 27, further comprising obtaining an indication of the length value.

Aspect 29: The method of Aspect 28, wherein obtaining the length value comprises at least one of receiving an indication of the length value or obtaining the length value based at least in part on a wireless communication standard.

Aspect 30: The method of Aspect 29, wherein receiving the indication of the length value comprises receiving at least one of a system information block that includes the length value or a radio resource control message that includes the length value.

Aspect 31: The method of any of Aspects 27-30, wherein the length value comprises at least one of: a nominal radius of Earth, a mean radius of Earth, an authalic radius of Earth, a volumetric radius of Earth, a rectifying radius of Earth, a global mean radius of curvature of Earth, or an additional offset value.

Aspect 32: The method of any of Aspects 27-31, wherein the orbit radius indication comprises an explicit indication of the offset value or an implicit indication of the offset value.

Aspect 33: The method of any of Aspects 21-32, further comprising receiving a coordinate indication that indicates at least one of a position coordinate associated with the non-terrestrial communication device or a velocity coordinate associated with the non-terrestrial communication device.

Aspect 34: The method of Aspect 33, wherein receiving the orbit radius indication comprises receiving a first communication and wherein receiving the coordinate indication comprises receiving a second communication.

Aspect 35: The method of Aspect 34, wherein the first communication comprises a first system information block (SIB) having a first SIB type and wherein the second communication comprises a second SIB having a second SIB type.

Aspect 36: The method of either of Aspects 34 or 35, further comprising: receiving a first plurality of additional communications comprising a first plurality of additional SIBs having the first SIB type; and receiving a second plurality of additional communications comprising a second plurality of additional SIBs having the second SIB type.

Aspect 37: The method of Aspect 36, wherein receiving the first plurality of additional communications comprises receiving the first plurality of additional communications according to a first associated frequency of transmission and wherein receiving the second plurality of additional communications comprises receiving the second plurality of additional communications according to a second associated frequency of transmission.

Aspect 38: The method of any of Aspects 34-37, wherein the orbit radius indication comprises an implicit indication and wherein the coordinate indication comprises an explicit indication.

Aspect 39: The method of Aspect 38, wherein receiving the orbit radius indication comprises receiving system information during a current communication session with a non-terrestrial network, the method further comprising: determining a prior orbit radius during a prior communication session with the non-terrestrial network; and mapping the system information to the prior orbit radius to determine a current orbit radius.

Aspect 40: A method of wireless communication performed at a user equipment (UE), comprising: receiving a bit indication associated with a number of bits in a set of bits to be used to communicate a coordinate indication associated with a coordinate, wherein the coordinate comprises at least one of a position coordinate associated with a non-terrestrial communication device or a velocity coordinate associated with the non-terrestrial communication device; and receiving the coordinate indication, wherein the coordinate indication comprises the set of bits.

Aspect 41: The method of Aspect 40, wherein the bit indication indicates an offset from a minimum number of bits.

Aspect 42: The method of either of Aspects 40 or 41, wherein the bit indication corresponds to an entry in a bit number table.

Aspect 43: The method of any of Aspects 40-42, wherein the coordinate indication comprises an orbit radius indication associated with an orbit radius of the non-terrestrial communication device, the method further comprising determining a maximum value of the coordinate based at least in part on a determination of at least one of a maximum value of the orbit radius and a major semi axis.

Aspect 44: The method of Aspect 43, further comprising determining a range for the coordinate, wherein the range includes the maximum value of the coordinate and a minimum value of the coordinate, the minimum value of the coordinate comprising a negative of the maximum value of the coordinate.

Aspect 45: The method of Aspect 44, further comprising: quantizing the range for the coordinate to determine a quantized range; and mapping the quantized range to a number represented by the set of bits.

Aspect 46: A method of wireless communication performed at a non-terrestrial communication device, comprising: determining a selected position coordinate of a plurality of position coordinates to be calculated by a user equipment (UE) based on one or more of the plurality of position coordinates; and transmitting a coordinate switch indication associated with the selected position coordinate to the UE.

Aspect 47: The method of Aspect 46, wherein the coordinate switch indication is based at least in part on a determination that a prior selected position coordinate is associated with an error that satisfies an error threshold.

Aspect 48: The method of either of Aspects 46 or 47, wherein the coordinate switch indication is based at least in part on a determination that an absolute value of a prior selected position coordinate fails to satisfy a coordinate threshold.

Aspect 49: The method of any of Aspects 46-48, wherein the coordinate switch indication is based at least in part on a determination that the selected position coordinate has a greater absolute value than one or more absolute values of the one or more of the plurality of position coordinates.

Aspect 50: The method of any of Aspects 46-49, wherein the coordinate switch indication comprises one bit.

Aspect 51: The method of Aspect 50, wherein the coordinate switch indication indicates that a prior selected position coordinate is not to be changed or that the prior selected position coordinate is to be changed.

Aspect 52: The method of any of Aspects 46-49, wherein the coordinate switch indication comprises two bits that indicate the selected position coordinate.

Aspect 53: The method of any of Aspects 46-49, wherein the coordinate switch indication comprises a three bit bitmap that indicates the selected position coordinate.

Aspect 54: A method of wireless communication performed at a non-terrestrial communication device, comprising: determining a selected velocity coordinate of a plurality of velocity coordinates to be calculated by a user equipment (UE) based on one or more of the plurality of velocity coordinates; and transmitting a coordinate switch indication associated with the selected velocity coordinate to the UE.

Aspect 55: The method of Aspect 54, wherein the coordinate switch indication is based at least in part on a determination that a prior selected velocity coordinate is associated with an error that satisfies an error threshold.

Aspect 56: The method of either of Aspects 54 or 55, wherein the coordinate switch indication is based at least in part on a determination that an absolute value of a prior selected velocity coordinate fails to satisfy a coordinate threshold.

Aspect 57: The method of any of Aspects 54-56, wherein the coordinate switch indication is based at least in part on a determination that the selected velocity coordinate has a greater absolute value than one or more absolute values of the one or more of the plurality of velocity coordinates.

Aspect 58: The method of any of Aspects 54-57, wherein the coordinate switch indication comprises one bit.

Aspect 59: The method of Aspect 58, wherein the coordinate switch indication indicates that a prior selected velocity coordinate is not to be changed or that the prior selected velocity coordinate is to be changed.

Aspect 60: The method of any of Aspects 54-59, wherein the coordinate switch indication comprises two bits that indicate the selected velocity coordinate.

Aspect 61: The method of any of Aspects 54-60, wherein the coordinate switch indication comprises a three bit bitmap that indicates the selected velocity coordinate.

Aspect 62: A method of wireless communication performed at a non-terrestrial communication device, comprising: receiving a model indication that indicates a computation model type to be used by a user equipment (UE) to determine one or more ephemeris coordinates associated with the non-terrestrial communication device; and transmitting a correction indication that indicates one or more correction values for the one or more ephemeris coordinates based at least in part on the computation model type.

Aspect 63: A method of wireless communication performed at a non-terrestrial communication device, comprising: determining an orbit radius of the non-terrestrial communication device; and transmitting an orbit radius indication associated with the orbit radius.

Aspect 64: The method of Aspect 63, wherein the orbit radius indication indicates an orbit range corresponding to the orbit radius, wherein the orbit range includes a range of possible radius values from zero to a maximum orbit value.

Aspect 65: The method of either of Aspects 63 or 64, wherein the orbit radius indication comprises an explicit indication of the orbit radius.

Aspect 66: The method of Aspect 65, wherein the explicit indication comprises at least one of an encoded value based on a uniform quantization or a table of values of radii with non-uniform quantization.

Aspect 67: The method of any of Aspects 63-66, wherein the orbit radius indication comprises an implicit indication of the orbit radius.

Aspect 68: The method of Aspect 67, wherein the implicit indication comprises system information associated with at least one of the non-terrestrial communication device, a non-terrestrial network associated with the non-terrestrial communication device, or an additional non-terrestrial communication device associated with the non-terrestrial network.

Aspect 69: The method of any of Aspects 63-68, wherein the orbit radius indication comprises an offset value relative to a length value.

Aspect 70: The method of Aspect 69, further comprising transmitting an indication of the length value.

Aspect 71: The method of Aspect 70, wherein transmitting the indication of the length value comprises transmitting at least one of a system information block that includes the length value or a radio resource control message that includes the length value.

Aspect 72: The method of any of Aspects 69-71, wherein the length value comprises at least one of: a nominal radius of Earth, a mean radius of Earth, an authalic radius of Earth, a volumetric radius of Earth, a rectifying radius of Earth, a global mean radius of curvature of Earth, or an additional offset value.

Aspect 73: The method of any of Aspects 69-72, wherein the orbit radius indication comprises an explicit indication of the offset value or an implicit indication of the offset value.

Aspect 74: The method of any of Aspects 63-73, further comprising transmitting a coordinate indication that indicates at least one of a position coordinate associated with the non-terrestrial communication device or a velocity coordinate associated with the non-terrestrial communication device.

Aspect 75: The method of Aspect 74, wherein transmitting the orbit radius indication comprises transmitting a first communication and wherein transmitting the coordinate indication comprises transmitting a second communication.

Aspect 76: The method of Aspect 75, wherein the first communication comprises a first system information block (SIB) having a first SIB type and wherein the second communication comprises a second SIB having a second SIB type.

Aspect 77: The method of either of Aspects 75 or 76, further comprising: transmitting a first plurality of additional communications comprising a first plurality of additional SIBs having the first SIB type; and transmitting a second plurality of additional communications comprising a second plurality of additional SIBs having the second SIB type.

Aspect 78: The method of Aspect 77, wherein transmitting the first plurality of additional communications comprises transmitting the first plurality of additional communications according to a first associated frequency of transmission and wherein transmitting the second plurality of additional communications comprises transmitting the second plurality of additional communications according to a second associated frequency of transmission.

Aspect 79: The method of any of Aspects 75-78, wherein the orbit radius indication comprises an implicit indication and wherein the coordinate indication comprises an explicit indication.

Aspect 80: The method of Aspect 79, wherein transmitting the orbit radius indication comprises transmitting system information during a current communication session with a non-terrestrial network, the method further comprising determining a prior orbit radius during a prior communication session with the non-terrestrial network; and transmitting an indication of the prior orbit radius.

Aspect 81: A method of wireless communication performed at a non-terrestrial communication device, comprising: transmitting a bit indication associated with a number of bits in a set of bits to be used to communicate a coordinate indication associated with a coordinate, wherein the coordinate comprises at least one of a position coordinate associated with the non-terrestrial communication device or a velocity coordinate associated with the non-terrestrial communication device; and transmitting the coordinate indication, wherein the coordinate indication comprises the set of bits.

Aspect 82: The method of Aspect 81, wherein the bit indication indicates an offset from a minimum number of bits.

Aspect 83: The method of either of Aspects 81 or 82, wherein the bit indication corresponds to an entry in a bit number table.

Aspect 84: The method of any of Aspects 81-83, wherein the coordinate indication comprises an orbit radius indication associated with an orbit radius of the non-terrestrial communication device.

Aspect 85: An apparatus for wireless communication, comprising a processor; memory coupled with the processor; and instructions stored in the memory and executable by the processor to cause the apparatus to perform the method of one or more of Aspects 1-9.

Aspect 86: A device for wireless communication, comprising a memory and one or more processors coupled to the memory, the one or more processors configured to perform the method of one or more of Aspects 1-9.

Aspect 87: An apparatus for wireless communication, comprising at least one means for performing the method of one or more of Aspects 1-9.

Aspect 88: A non-transitory computer-readable medium storing code for wireless communication, the code comprising instructions executable by a processor to perform the method of one or more of Aspects 1-9.

Aspect 89: A non-transitory computer-readable medium storing a set of instructions for wireless communication, the set of instructions comprising one or more instructions that, when executed by one or more processors of a device, cause the device to perform the method of one or more of Aspects 1-9.

Aspect 90: An apparatus for wireless communication at a device, comprising a processor; memory coupled with the processor; and instructions stored in the memory and executable by the processor to cause the apparatus to perform the method of one or more of Aspects 10-18.

Aspect 91: A device for wireless communication, comprising a memory and one or more processors coupled to the memory, the one or more processors configured to perform the method of one or more of Aspects 10-18.

Aspect 92: An apparatus for wireless communication, comprising at least one means for performing the method of one or more of Aspects 10-18.

Aspect 93: A non-transitory computer-readable medium storing code for wireless communication, the code comprising instructions executable by a processor to perform the method of one or more of Aspects 10-18.

Aspect 94: A non-transitory computer-readable medium storing a set of instructions for wireless communication, the set of instructions comprising one or more instructions that, when executed by one or more processors of a device, cause the device to perform the method of one or more of Aspects 10-18.

Aspect 95: An apparatus for wireless communication at a device, comprising a processor; memory coupled with the processor; and instructions stored in the memory and executable by the processor to cause the apparatus to perform the method of one or more of Aspects 19-20.

Aspect 96: A device for wireless communication, comprising a memory and one or more processors coupled to the memory, the one or more processors configured to perform the method of one or more of Aspects 19-20.

Aspect 97: An apparatus for wireless communication, comprising at least one means for performing the method of one or more of Aspects 19-20.

Aspect 98: A non-transitory computer-readable medium storing code for wireless communication, the code comprising instructions executable by a processor to perform the method of one or more of Aspects 19-20.

Aspect 99: A non-transitory computer-readable medium storing a set of instructions for wireless communication, the set of instructions comprising one or more instructions that, when executed by one or more processors of a device, cause the device to perform the method of one or more of Aspects 19-20.

Aspect 100: An apparatus for wireless communication at a device, comprising a processor; memory coupled with the processor; and instructions stored in the memory and executable by the processor to cause the apparatus to perform the method of one or more of Aspects 21-39.

Aspect 101: A device for wireless communication, comprising a memory and one or more processors coupled to the memory, the one or more processors configured to perform the method of one or more of Aspects 21-39.

Aspect 102: An apparatus for wireless communication, comprising at least one means for performing the method of one or more of Aspects 21-39.

Aspect 103: A non-transitory computer-readable medium storing code for wireless communication, the code comprising instructions executable by a processor to perform the method of one or more of Aspects 21-39.

Aspect 104: A non-transitory computer-readable medium storing a set of instructions for wireless communication, the set of instructions comprising one or more instructions that, when executed by one or more processors of a device, cause the device to perform the method of one or more of Aspects 21-39.

Aspect 105: An apparatus for wireless communication at a device, comprising a processor; memory coupled with the processor; and instructions stored in the memory and executable by the processor to cause the apparatus to perform the method of one or more of Aspects 40-45.

Aspect 106: A device for wireless communication, comprising a memory and one or more processors coupled to the memory, the one or more processors configured to perform the method of one or more of Aspects 40-45.

Aspect 107: An apparatus for wireless communication, comprising at least one means for performing the method of one or more of Aspects 40-45.

Aspect 108: A non-transitory computer-readable medium storing code for wireless communication, the code comprising instructions executable by a processor to perform the method of one or more of Aspects 40-45.

Aspect 109: A non-transitory computer-readable medium storing a set of instructions for wireless communication, the set of instructions comprising one or more instructions that, when executed by one or more processors of a device, cause the device to perform the method of one or more of Aspects 40-45.

Aspect 110: An apparatus for wireless communication at a device, comprising a processor; memory coupled with the processor; and instructions stored in the memory and executable by the processor to cause the apparatus to perform the method of one or more of Aspects 46-53.

Aspect 111: A device for wireless communication, comprising a memory and one or more processors coupled to the memory, the one or more processors configured to perform the method of one or more of Aspects 46-53.

Aspect 112: An apparatus for wireless communication, comprising at least one means for performing the method of one or more of Aspects 46-53.

Aspect 113: A non-transitory computer-readable medium storing code for wireless communication, the code comprising instructions executable by a processor to perform the method of one or more of Aspects 46-53.

Aspect 114: A non-transitory computer-readable medium storing a set of instructions for wireless communication, the set of instructions comprising one or more instructions that, when executed by one or more processors of a device, cause the device to perform the method of one or more of Aspects 46-53.

Aspect 115: An apparatus for wireless communication at a device, comprising a processor; memory coupled with the processor; and instructions stored in the memory and executable by the processor to cause the apparatus to perform the method of one or more of Aspects 54-61.

Aspect 116: A device for wireless communication, comprising a memory and one or more processors coupled to the memory, the one or more processors configured to perform the method of one or more of Aspects 54-61.

Aspect 117: An apparatus for wireless communication, comprising at least one means for performing the method of one or more of Aspects 54-61.

Aspect 118: A non-transitory computer-readable medium storing code for wireless communication, the code comprising instructions executable by a processor to perform the method of one or more of Aspects 54-61.

Aspect 119: A non-transitory computer-readable medium storing a set of instructions for wireless communication, the set of instructions comprising one or more instructions that, when executed by one or more processors of a device, cause the device to perform the method of one or more of Aspects 54-61.

Aspect 120: An apparatus for wireless communication at a device, comprising a processor; memory coupled with the processor; and instructions stored in the memory and executable by the processor to cause the apparatus to perform the method of Aspect 62.

Aspect 121: A device for wireless communication, comprising a memory and one or more processors coupled to the memory, the one or more processors configured to perform the method of Aspect 62.

Aspect 122: An apparatus for wireless communication, comprising at least one means for performing the method of Aspect 62.

Aspect 123: A non-transitory computer-readable medium storing code for wireless communication, the code comprising instructions executable by a processor to perform the method of Aspect 62.

Aspect 124: A non-transitory computer-readable medium storing a set of instructions for wireless communication, the set of instructions comprising one or more instructions that, when executed by one or more processors of a device, cause the device to perform the method of Aspect 62.

Aspect 125: An apparatus for wireless communication at a device, comprising a processor; memory coupled with the processor; and instructions stored in the memory and executable by the processor to cause the apparatus to perform the method of one or more of Aspects 63-80.

Aspect 126: A device for wireless communication, comprising a memory and one or more processors coupled to the memory, the one or more processors configured to perform the method of one or more of Aspects 63-80.

Aspect 127: An apparatus for wireless communication, comprising at least one means for performing the method of one or more of Aspects 63-80.

Aspect 128: A non-transitory computer-readable medium storing code for wireless communication, the code comprising instructions executable by a processor to perform the method of one or more of Aspects 63-80.

Aspect 129: A non-transitory computer-readable medium storing a set of instructions for wireless communication, the set of instructions comprising one or more instructions that, when executed by one or more processors of a device, cause the device to perform the method of one or more of Aspects 63-80.

Aspect 130: An apparatus for wireless communication at a device, comprising a processor; memory coupled with the processor; and instructions stored in the memory and executable by the processor to cause the apparatus to perform the method of one or more of Aspects 81-84.

Aspect 131: A device for wireless communication, comprising a memory and one or more processors coupled to the memory, the one or more processors configured to perform the method of one or more of Aspects 81-84.

Aspect 132: An apparatus for wireless communication, comprising at least one means for performing the method of one or more of Aspects 81-84

Aspect 133: A non-transitory computer-readable medium storing code for wireless communication, the code comprising instructions executable by a processor to perform the method of one or more of Aspects 81-84.

Aspect 134: A non-transitory computer-readable medium storing a set of instructions for wireless communication, the set of instructions comprising one or more instructions that, when executed by one or more processors of a device, cause the device to perform the method of one or more of Aspects 81-84.

Aspect 135: A method of wireless communication performed at a user equipment (UE), comprising: receiving a coordinate switch indication that indicates that the apparatus is to calculate a first value of a new ephemeris coordinate, of a plurality of ephemeris coordinates; calculating the first value of the new ephemeris coordinate based on receiving the coordinate switch indication, wherein the calculation of the first value of the new ephemeris coordinate is based on one or more other ephemeris coordinates of the plurality of ephemeris coordinates; generating ephemeris information, associated with a non-terrestrial communication device, based on the calculation of the first value of the new ephemeris coordinate; and communicating with the non-terrestrial communication device based on the ephemeris information.

Aspect 136: The method of Aspect 135, wherein the coordinate switch indication is based at least in part on a determination that a prior ephemeris coordinate is associated with an error that satisfies an error threshold.

Aspect 137: The method of either of Aspects 135 or 136, wherein the coordinate switch indication is based at least in part on a determination that an absolute value of a prior ephemeris coordinate fails to satisfy a coordinate threshold.

Aspect 138: The method of any of Aspects 135-137, wherein the coordinate switch indication indicates the new ephemeris coordinate.

Aspect 139: The method of Aspect 138, wherein the coordinate switch indication is based at least in part on a determination that a second value, different from the first value, of the new ephemeris coordinate has a greater absolute value than one or more absolute values of the one or more other ephemeris coordinates.

Aspect 140: The method of any of Aspects 135-139, wherein the coordinate switch indication comprises one bit.

Aspect 141: The method of Aspect 140, wherein a first value of the one bit indicates that the apparatus is to calculate the first value of the new ephemeris coordinate.

Aspect 142: The method of Aspect 141, further comprising selecting the new ephemeris coordinate based at least in part on the one bit having the first value, the method further comprising selecting the new ephemeris coordinate based at least in part on at least one of: a second value, different from the first value, of the new ephemeris coordinate having a greater absolute value than one or more absolute values of the one or more other ephemeris coordinates, or an order of selection.

Aspect 143: The method of any of Aspects 135-139, wherein the coordinate switch indication comprises two bits that indicate the new ephemeris coordinate.

Aspect 144: The method of any of Aspects 135-139, wherein the coordinate switch indication comprises a three bit bitmap that indicates the new ephemeris coordinate.

Aspect 145: The method of any of Aspects 135-144, wherein the plurality of ephemeris coordinates comprises at least one of a position coordinate or a velocity coordinate.

Aspect 146: A method of wireless communication performed at a non-terrestrial communication device, comprising: determining that a first value of a new ephemeris coordinate, of a plurality of ephemeris coordinates, is to be calculated by a user equipment (UE); and transmitting a coordinate switch indication that indicates that the UE is to calculate the first value of the new ephemeris coordinate.

Aspect 147: The method of Aspect 146, wherein the coordinate switch indication is based at least in part on a determination that a prior ephemeris coordinate is associated with an error that satisfies an error threshold.

Aspect 148: The method of either of Aspects 146 or 147, wherein the coordinate switch indication is based at least in part on a determination that an absolute value of a prior ephemeris coordinate fails to satisfy a coordinate threshold.

Aspect 149: The method of any of Aspects 146-148, wherein the coordinate switch indication indicates the new ephemeris coordinate.

Aspect 150: The method of Aspect 149, wherein the coordinate switch indication is based at least in part on a determination that a second value, different from the first value, of the new ephemeris coordinate has a greater absolute value than one or more absolute values of the one or more other ephemeris coordinates.

Aspect 151: The method of any of Aspects 146-150, wherein the coordinate switch indication comprises one bit.

Aspect 152: The method of Aspect 151, wherein a value of the one bit indicates that the UE is to calculate the first value of the new ephemeris coordinate.

Aspect 153: The method of any of Aspects 146-150, wherein the coordinate switch indication comprises two bits that indicate the new ephemeris coordinate.

Aspect 154: The method of any of Aspects 146-150, wherein the coordinate switch indication comprises a three bit bitmap that indicates the new ephemeris coordinate.

Aspect 155: The method of any of Aspects 146-154, wherein the plurality of ephemeris coordinates comprises at least one of a position coordinate or a velocity coordinate.

Aspect 156: An apparatus for wireless communication, comprising one or more processors; memory; and instructions stored in the memory and executable by the processor to cause the apparatus to perform the method of one or more of Aspects 135-145.

Aspect 157: A user equipment (UE), comprising a transceiver, a memory comprising instructions, and one or more processors configured to execute the instructions to cause the UE to perform the method of one or more of Aspects 135-145, wherein the transceiver is configured to receive the coordinate switch indication and communicate with the non-terrestrial communication device.

Aspect 158: An apparatus for wireless communication, comprising at least one means for performing the method of one or more of Aspects 135-145.

Aspect 159: A non-transitory computer-readable medium storing code for wireless communication, the code comprising instructions executable by a processor to perform the method of one or more of Aspects 135-145.

Aspect 160: An apparatus, comprising one or more processors; memory; and instructions stored in the memory and executable by the processor to cause the apparatus to perform the method of one or more of Aspects 146-156.

Aspect 161: A non-terrestrial communication device, comprising a transceiver, a memory comprising instructions, and one or more processors configured to execute the instructions to cause the non-terrestrial communication device to perform the method of one or more of Aspects 146-156, wherein the transceiver is configured to transmit the coordinate switch indication.

Aspect 162: An apparatus for wireless communication, comprising at least one means for performing the method of one or more of Aspects 146-156.

Aspect 163: A non-transitory computer-readable medium storing code for wireless communication, the code comprising instructions executable by a processor to perform the method of one or more of Aspects 146-156.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
   memory comprising instructions; and
   one or more processors configured to execute the instructions to cause the apparatus to:
   obtain a coordinate switch indication that indicates that the apparatus is to switch from calculating a first ephemeris coordinate to calculating a first value of a second ephemeris coordinate of a plurality of ephemeris coordinates;
   calculate the first value of the second ephemeris coordinate after receiving the coordinate switch indication, wherein the calculation of the first value of the second ephemeris coordinate is based on the first ephemeris coordinate and a third ephemeris coordinate of the plurality of ephemeris coordinates;
   generate ephemeris information, associated with a non-terrestrial communication device, based on the first value of the second ephemeris coordinate; and
   communicate with the non-terrestrial communication device in accordance with the ephemeris information.

2. The apparatus of claim 1, wherein the coordinate switch indication is based at least in part on the first ephemeris coordinate being associated with an error that satisfies an error threshold.

3. The apparatus of claim 1, wherein the coordinate switch indication is based at least in part on an absolute value of the first ephemeris coordinate failing to satisfy a coordinate threshold.

4. The apparatus of claim 1, wherein the coordinate switch indication indicates the second ephemeris coordinate.

5. The apparatus of claim 1, wherein the coordinate switch indication is based at least in part on a second value, different from the first value, of the second ephemeris coordinate having a greater absolute value than one or more absolute values of the first ephemeris coordinate and the third ephemeris coordinate.

6. The apparatus of claim 1, wherein the coordinate switch indication comprises one bit.

7. The apparatus of claim 6, wherein the one or more processors are further configured to cause the apparatus to:
   select the second ephemeris coordinate based at least in part on the one bit having a first value and at least one of:
   a second value, different from the first value, of the second ephemeris coordinate having a greater absolute value than one or more absolute values of the first ephemeris coordinate and the third ephemeris coordinate, or
   an order of selection.

8. The apparatus of claim 1, wherein the coordinate switch indication comprises two or more bits that indicate the second ephemeris coordinate.

9. The apparatus of claim 1, wherein the plurality of ephemeris coordinates comprises at least one of a position coordinate or a velocity coordinate.

10. The apparatus of claim 1, further comprising at least one transceiver configured to receive the coordinate switch indication, wherein the apparatus is configured as a user equipment.

11. An apparatus for wireless communication, comprising:
    memory comprising instructions; and
    one or more processors configured to execute the instructions to cause the apparatus to:
    output, for transmission, a coordinate switch indication that indicates that a user equipment (UE) is to switch from calculating a first ephemeris coordinate to calculating a first value of a second ephemeris coordinate of a plurality of ephemeris coordinates; and
    communicate with the UE in accordance with ephemeris information that is based on the first value of the second ephemeris coordinate.

12. The apparatus of claim 11, wherein the coordinate switch indication is based at least in part on the first ephemeris coordinate being associated with an error that satisfies an error threshold.

13. The apparatus of claim 11, wherein the coordinate switch indication is based at least in part on an absolute value of the first ephemeris coordinate failing to satisfy a coordinate threshold.

14. The apparatus of claim 11, wherein the coordinate switch indication indicates the second ephemeris coordinate.

15. The apparatus of claim 11, wherein the coordinate switch indication is based at least in part on a second value, different from the first value, of the second ephemeris coordinate having a greater absolute value than one or more absolute values of the first ephemeris coordinate and a third ephemeris coordinate of the plurality of ephemeris coordinates.

16. The apparatus of claim 11, wherein the coordinate switch indication comprises one bit.

17. The apparatus of claim 11, wherein the coordinate switch indication comprises two or more bits that indicate the second ephemeris coordinate.

18. The apparatus of claim 11, wherein the plurality of ephemeris coordinates comprises at least one of a position coordinate or a velocity coordinate.

19. The apparatus of claim 11, further comprising at least one transceiver configured to transmit the coordinate switch indication, wherein the apparatus is configured as a non-terrestrial communication device.

20. An apparatus for wireless communication, comprising:
- memory comprising instructions; and
- one or more processors configured to execute the instructions to cause the apparatus to:
  - obtain an orbit radius indication associated with an orbit radius of a non-terrestrial communication device;
  - generate ephemeris information associated with the non-terrestrial communication device based on the orbit radius; and
  - communicate with the non-terrestrial communication device in accordance with the ephemeris information.

* * * * *